United States Patent
DeSmit, Jr. et al.

(10) Patent No.: US 12,434,919 B2
(45) Date of Patent: Oct. 7, 2025

(54) ADJUSTABLE DIVIDER ASSEMBLY AND CONVEYOR INCORPORATING SAME

(71) Applicant: MacLean Mallard, L.L.C., Mundelein, IL (US)

(72) Inventors: Mark DeSmit, Jr., Lyndon, IL (US); Anthony Wade, Prophetstown, IL (US)

(73) Assignee: MacLean Mallard, L.L.C., Mundelein, IL (US)

( * ) Notice: Subject to any disclaimer, the term of this patent is extended or adjusted under 35 U.S.C. 154(b) by 74 days.

(21) Appl. No.: 18/484,589

(22) Filed: Oct. 11, 2023

(65) Prior Publication Data
US 2025/0019183 A1     Jan. 16, 2025

Related U.S. Application Data

(60) Provisional application No. 63/526,388, filed on Jul. 12, 2023.

(51) Int. Cl.
| | |
|---|---|
| *B65G 47/76* | (2006.01) |
| *B65G 13/11* | (2006.01) |
| *B65G 13/12* | (2006.01) |

(52) U.S. Cl.
CPC ............ *B65G 47/766* (2013.01); *B65G 13/11* (2013.01); *B65G 13/12* (2013.01)

(58) Field of Classification Search
CPC ....... B65G 47/766; B65G 13/11; B65G 13/12
USPC ......................................................... 198/367
See application file for complete search history.

(56) References Cited

U.S. PATENT DOCUMENTS

| | | | |
|---|---|---|---|
| 9,038,804 B1 * | 5/2015 | Nickell ................. | B65G 13/11 211/151 |
| 10,064,500 B2 * | 9/2018 | Furui ........................ | A47F 1/12 |
| 10,617,206 B2 * | 4/2020 | Brügmann ............ | A47B 57/588 |
| 10,709,264 B1 * | 7/2020 | Nagel ..................... | A47F 1/126 |
| 11,497,325 B2 * | 11/2022 | Peters ...................... | A47F 1/12 |
| 2010/0133219 A1 * | 6/2010 | Sun ......................... | A47F 1/125 211/151 |
| 2021/0171293 A1 * | 6/2021 | Iellimo .................. | B65G 1/023 |

* cited by examiner

*Primary Examiner* — James R Bidwell
(74) *Attorney, Agent, or Firm* — Reinhart Boerner Van Deuren P.C.

(57) ABSTRACT

A conveyor assembly is provided with one or more partitions to divide or segment one or more conveyor rows. The assembly comprises a conveyor including an inlet and an outlet, with conveyor transport surface extending between the inlet and the outlet, which may by roller wheels. A plurality of retainers are supported by the conveyor in spaced relation with at least one partition extending between the retainers. Mounting interfaces between the retainers and the at least one partition facilitate removable support of each partition by the retainers.

29 Claims, 19 Drawing Sheets

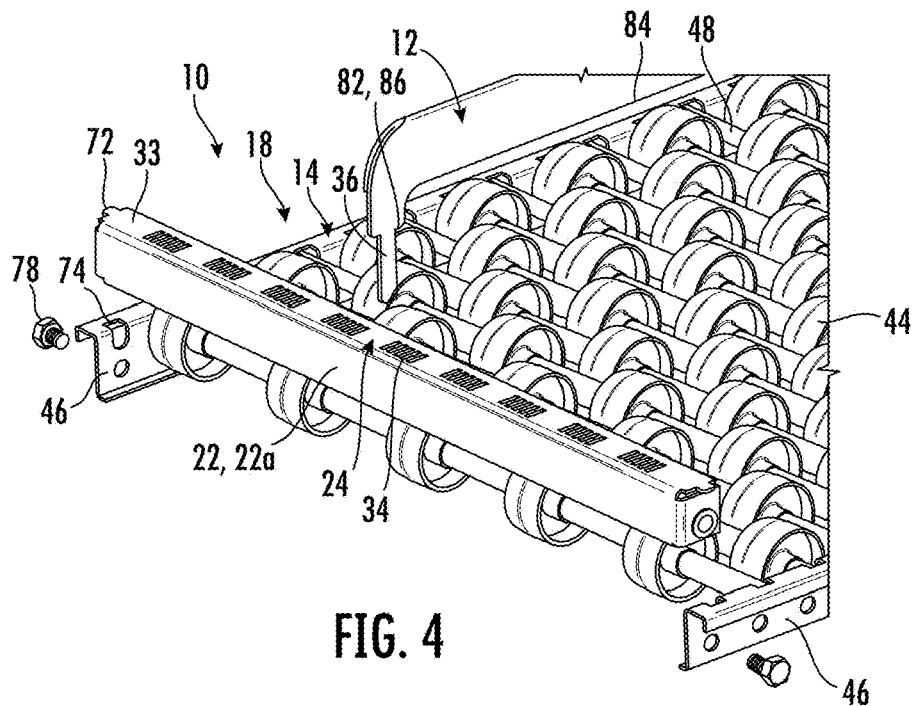
FIG. 4
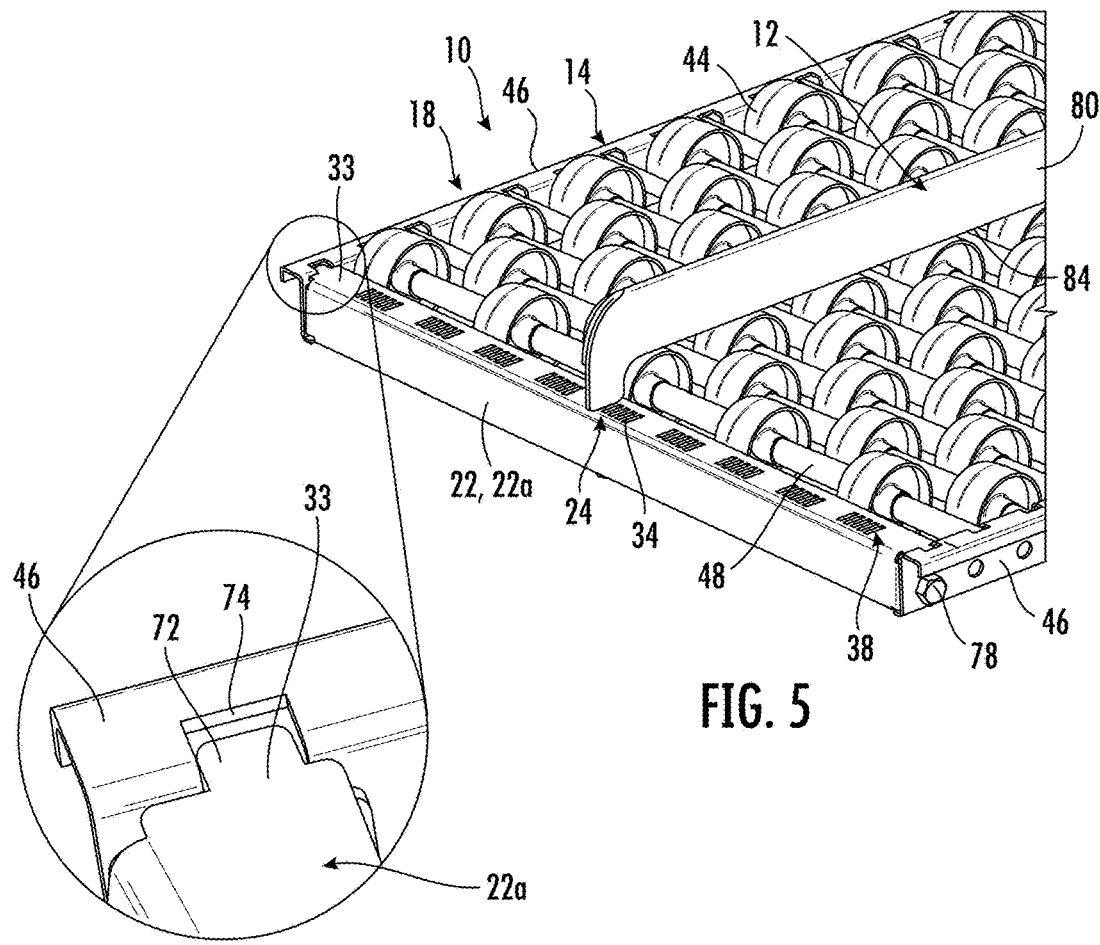
FIG. 5
FIG. 6

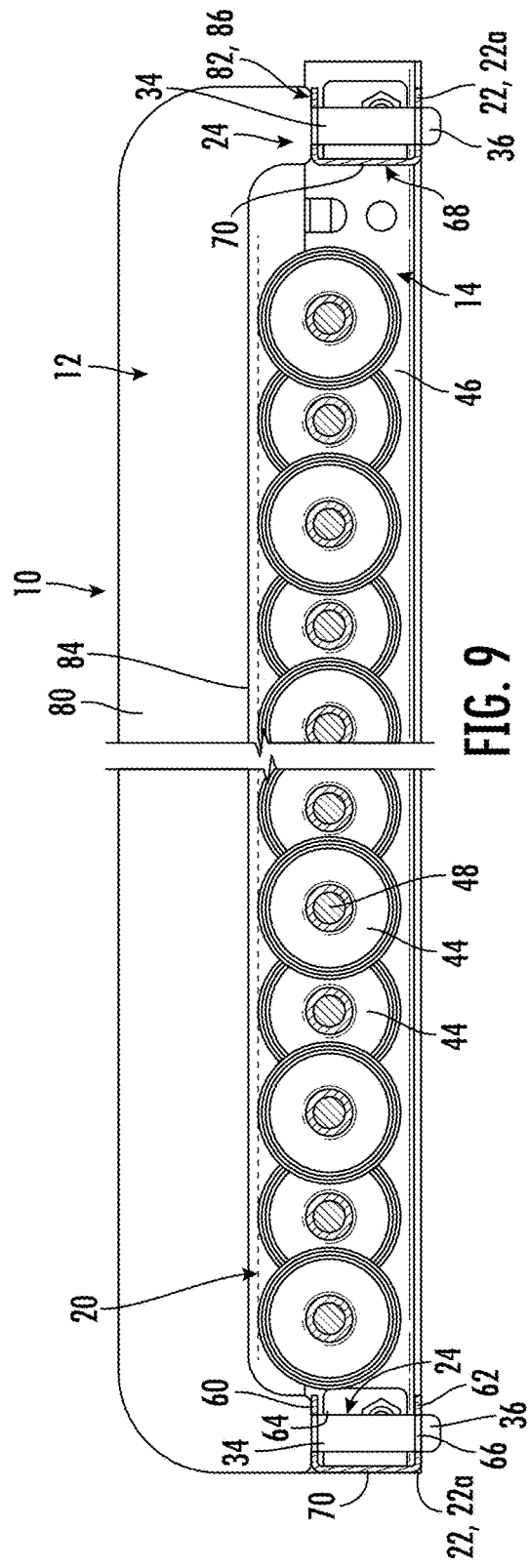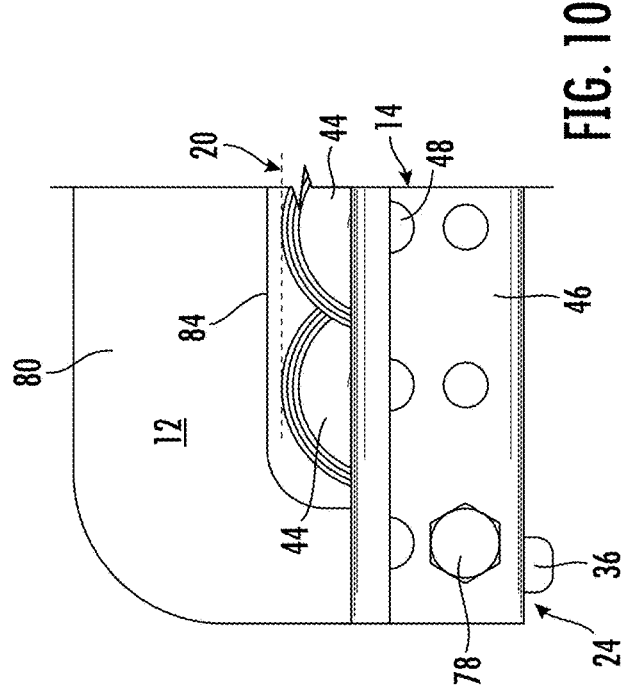
FIG. 9
FIG. 10

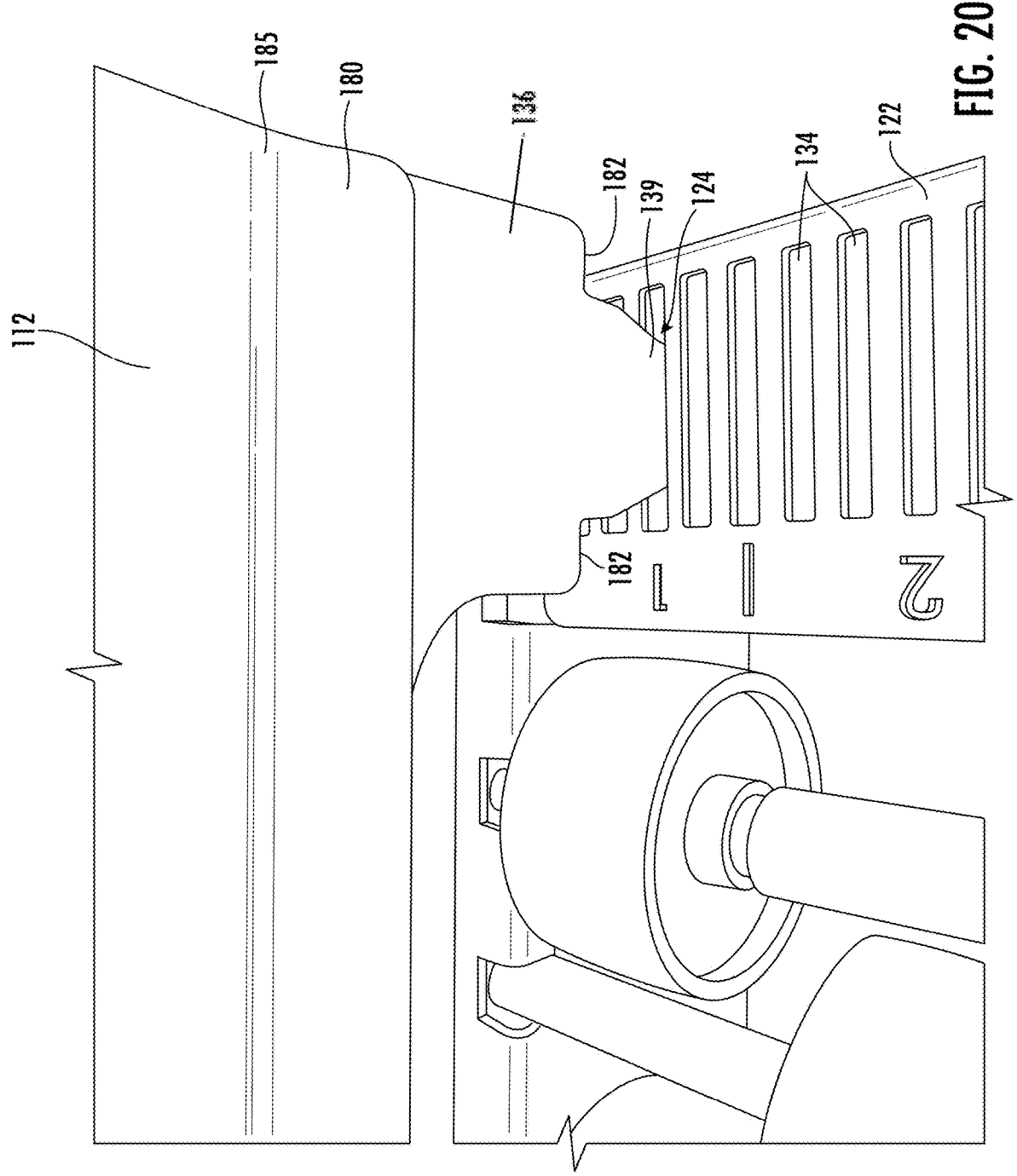

ADJUSTABLE DIVIDER ASSEMBLY AND CONVEYOR INCORPORATING SAME

CROSS-REFERENCE TO RELATED PATENT APPLICATIONS

This patent application claims the benefit of U.S. Provisional Patent Application No. 63/526,388, filed Jul. 12, 2023, the entire teachings and disclosure of which are incorporated herein by reference thereto.

FIELD OF THE INVENTION

This invention generally relates to conveyors and more particularly relates to the adjustability and/or widths of such conveyors.

BACKGROUND OF THE INVENTION

Conveyor assemblies are known in the art to facilitate transport of products such as boxes, goods and the like from one location to another in warehouses, factories, retail establishments, and/or other commercial uses. Such conveyor assemblies can be built into different lengths and widths.

Gravitational feed conveyors can be desirable as those facilitate transport from one location to another without the need for power and do so under the power of gravity. For example, low friction rollers that may also be referred to as wheels are often used to allow a small slant angle to facilitate smooth ready transport. The wheels collectively and effectively provide a conveyor transport surface (other conveyor transport surfaces may include low friction panels for example).

In warehouses, factories, or other industries, a bank of different conveyors may be used for separating different goods and/or create a buffer between workers (e.g., allowing one worker to create a build of goods while another worker may pick goods). When the desired goods to be conveyed change in terms of shapes or sizes, it may be difficult to reconfigure or change the bank of conveyors that is already set up. Often one may simply work with the conveyors they have and use them as best as possible even though a conveyor may be oversized for a particular product.

BRIEF SUMMARY OF THE INVENTION

An inventive aspect is directed toward conveyor assembly with at least one partition extending between the retainers. The conveyor assembly further comprises a conveyor including an inlet and an outlet, and a conveyor transport surface extending between the inlet and the outlet. The retainers are supported by the conveyor in spaced relation. Mounting interfaces between the retainers and the at least one partition facilitate removable support of each partition by the retainers.

Various features in the paragraphs below may be used with this inventive aspect alone and/or in combination.

The mounting interfaces may comprise mounting slots and mounting tabs, with the mounting slots configured to removably receive the mounting tabs.

The mounting slots may be provided by the retainers and the mounting tabs may be provided by the at least one partition.

Each retainer may comprise a row of the mounting slots that extends transversely relative to a longitudinal span of the conveyor between the inlet and the outlet. The at least one partition can be moved laterally between different positions to segment, divide or segment and divide the conveyor transport surface into one or more lanes of select width.

Preferably the conveyor employs rollers (also referenced as wheels) and is of the roller conveyor type. For example, the conveyor may comprise: (a) a pair of rails extending parallel to the longitudinal span in spaced relation; (b) a plurality of rods extending transversely between the rails; and (c) a plurality of wheels supported by the rods for rotation relative to the rails, the conveyor transport surface provided collectively by the wheels.

In the above feature, the wheels can be arranged in spaced relationship laterally into a plurality of wheel rows with the wheel rows extending longitudinally between the inlet and the outlet in parallel relationship with the rails creating rows of gaps that are free of the wheels, the rows of gaps extending longitudinally between the inlet and the outlet in parallel relationship with the rails. Further, the mounting slots can be aligned with the rows of gaps to prevent a wheel from acting on both sides of the at least one partition.

In the above feature, the mounting slots may be arranged in a series of sets spanning between the rails, with each set comprising at least two of the mounting slots, each set being respectively aligned with one of the rows of gaps, and with each retainer defining a series of solid non-slotted segments defined between adjacent members of the sets.

Each retainer may comprise an upper panel and a lower panel arranged in spaced relationship. The upper and lower panels can respectively define upper and lower slots that are in alignment to provide the mounting slots. Thereby, the mounting tabs can pass through both of the upper panel and the lower panel.

Each retainer may include a U-shaped channel further comprising a connecting panel, the connecting panel spacing apart and joining between the upper panel and the lower panel.

Such U-shaped channel may further comprise: (a) location tabs on opposite sides engaging with cutouts in space relation formed into the rails of the conveyor; and (b) end panels joined to at least one of the panels; and further comprising fasteners securing the end panels and thereby the U-shaped channel to the rails.

Frequently, the at least one partition will comprise at least two partitions creating at least one lane of adjustable size.

The at least one partition may comprise outer partitions and at least one intermediate partition creating at least two lanes of adjustable size.

The conveyor preferably comprises: (a) a pair of rails extending parallel to the longitudinal span in spaced relation; (b) a plurality of rods extending transversely between the rails; and (c) a plurality of wheels supported by the rods for rotation relative to the rails, the conveyor transport surface provided collectively by the wheels.

The retainers may include an inlet retainer in a region of the inlet and an outlet retainer in a region of the outlet.

If support is needed for longer conveyor lengths and/or thinner partitions, the assembly may comprise at least one intermediate retainer positioned intermediate of the inlet retainer and the outlet retainer. Additionally, or alternatively shaping of the partition to a non-flat profile can be done such as with one or more corrugations to provide additional rigidity to limit bending dislocation of the partition.

A tab and slot mounting interface may engage between each intermediate retainer and each partition.

Preferably, the conveyor is a gravitational feed conveyor with the inlet elevated vertically relative to the outlet to facilitate gravitational transfer between the inlet toward the outlet, and further comprising an end stop positioned at the outlet.

An outlet retainer of the retainers may be positioned at an end of the outlet between the end stop and the wheels.

An inlet retainer of the retainers may be positioned at an end of the inlet upstream from all of the wheels.

Each partition may comprise a partition wall extending between the inlet and the outlet. Further, each partition may furthering include abutments, with the abutments engaging the retainers, respectively in order to space the partition wall vertically the conveyor transport surface without contact therebetween.

The partition may define mounting tabs, with each mounting tab depending from the partition wall and including a step to provide for abutments.

The partition wall and the mounting tabs may be provided by a unitary sheet metal panel.

Each partition may include a partition wall extending between the retainers, with the partition wall having a bottom edge that is elevated and thereby spaced above the conveyor transport surface.

Each partition may be formed from a sheet metal panel that is of folded construction, preferably creating a smooth radiused tip along the top edge thereof with a hem portion along one side. Preferably, corners are also radiused to prevent hard corners. Such sheet metal panel may also be formed with at least one and preferably multiple corrugations to provide rigidity.

When the retainers include an inlet retainer and an outlet retainer, each of the inlet and outlet retainers may further comprises a plurality of reference characters corresponding mounting locations configured to facilitate alignment of partition mounting among the inlet retainer and the outlet retainer parallel to a longitudinal extent of the conveyor. This allows workers to readily configure lane width and change lane width by matching slot locations at opposite inlet and outlet ends.

In an embodiment, each retainer comprises a rod and a sleeve, with the sleeve surrounding the rod. The rod may be mounted into holes of a pair of rails of the conveyor (which may be same holes used to mount wheels). Further the sleeve projects laterally between the rails, with the sleeve further comprising locating tabs at opposite ends engaging the rails. No further rail modifications may be necessitated for mounting of rails.

When interfaces comprise mounting slots and mounting tabs, with the mounting slots configured to removably receive the mounting tabs, each mounting tab in an embodiment may comprises a pair of prongs of the partition that engage in a pair of slots on opposite sides of a central projection of the retainer, the central projection extending between prongs. Such embodiment also may show that the retainer also in effect mounting tabs that are received into mounting slots between the prongs of the partitions.

Another feature is the provision for a snap fit between the retainers and the at least one partition.

Another inventive aspect is directed toward dividing a conveyor including an inlet and an outlet with conveyor transport surface extending between the inlet and the outlet. The conveyor comprises: (a) a pair of rails extending parallel to the longitudinal span in spaced relation; (b) a plurality of rods extending transversely between the rails; and (c) a plurality of wheels supported by the rods for rotation relative to the rails, the conveyor transport surface provided collectively by the wheels. The method comprises: arranging at least one partition at location laterally between the rails in parallel relationship with the rails; and removably retaining the at least one partition to the conveyor among different locations.

In the method, frequently, the at least one partition comprises at least two partitions, and further comprises creating at least one lane of adjustable size with the at least two partitions.

The method can further comprise adjusting the size of the at least one lane by repositioning at least one of the partitions on spaced apart retainers that perform said removably retaining.

The at least one partition may comprise outer partitions and at least one intermediate partition. The method may further comprise creating at least two lanes of adjustable size with the outer partitions and the at least one intermediate partition.

The method may further comprise adjusting the size of the at least two lanes by repositioning one or more of either or both of the outer partitions and the at least one intermediate partition on said spaced apart retainers that perform said removably retaining.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is an exploded isometric assembly view of one of the inlet/outlet end portions of the conveyor assembly of FIG. 1, it being understood that the inlet/outlet ends being configured the same and are interchangeable (at least the outlet end may optionally have an end stop as in FIG. 16);

FIG. 5 is generally the same view as FIG. 4, but with the partition mounted in place into the retainer;

FIG. 6 is a detail view of a portion of FIG. 5, better showing the retainer engagement with conveyor rails;

FIG. 9 is a cross-sectional, side view of the conveyor assembly shown in FIG. 1, the cross-section being through a vertical plane parallel to the conveyor side rails (and with break lines removing a middle portion to better show opposite ends and mounting of the partition with the retainers);

FIG. 10. is an enlarged view of one of the ends of that of FIG. 9, but not in cross-section;

Figure 1:
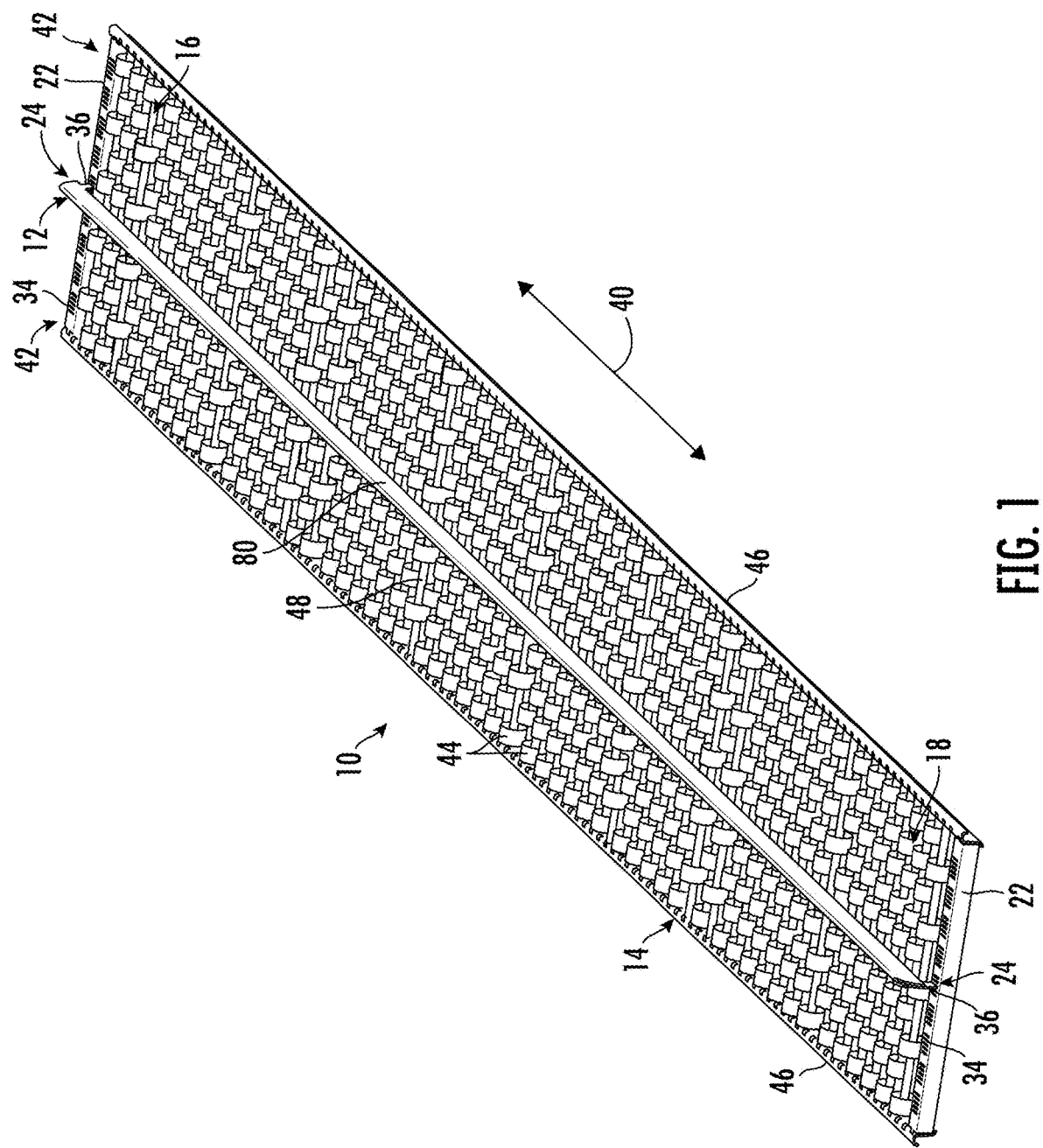
FIG. 1 is an isometric view of a conveyor assembly incorporating at least one partition (and in this case a single partition and two retainers), according to a first embodiment of the present invention.
Figure 2:
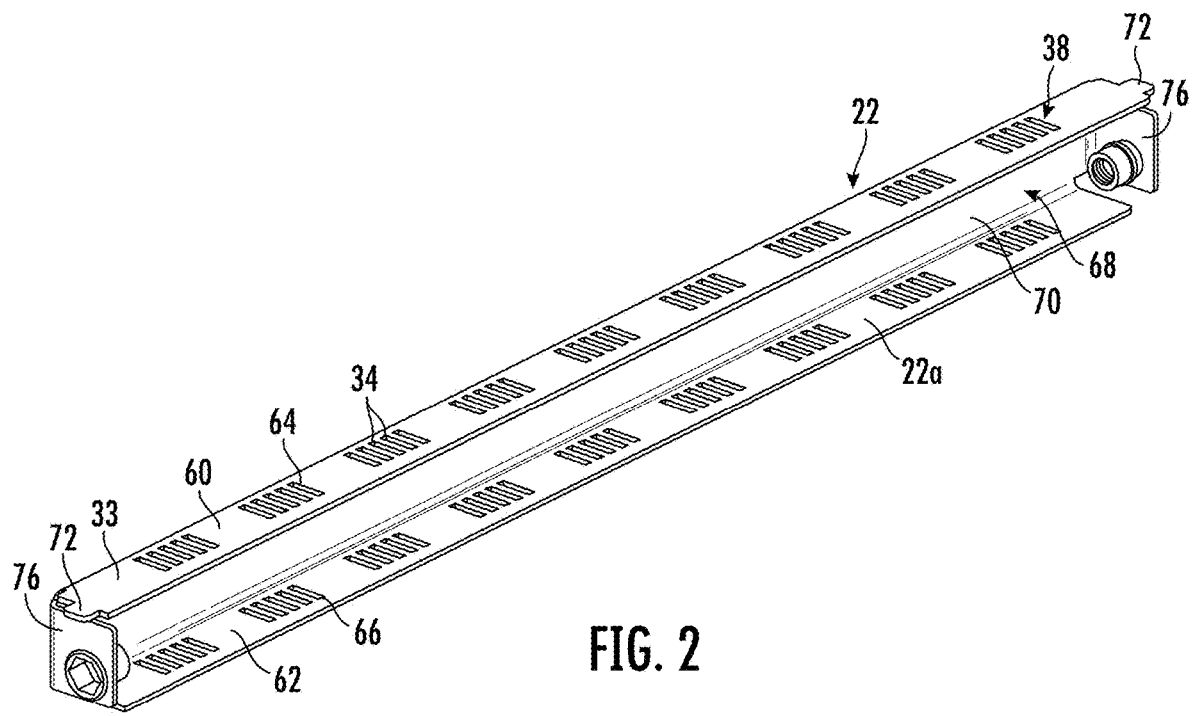
FIG. 2 is an isometric view of the retainers used in conveyor assembly of FIG. 1.
Figure 11:
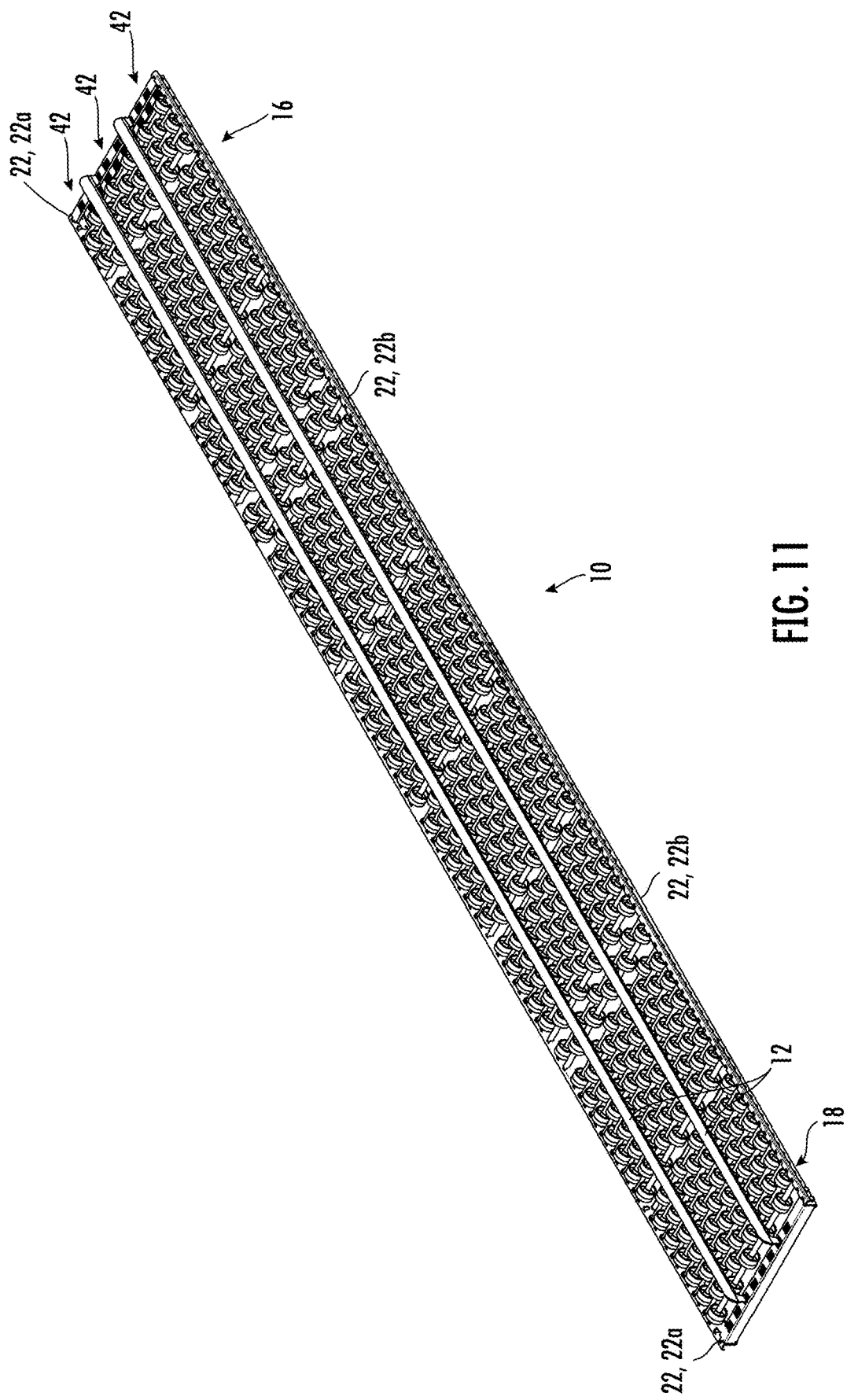
FIG. 11 is an isometric view of a conveyor assembly according to a second embodiment that is the same as that as FIG. 1 (such that the disclosure and teachings of FIG. 1 are applicable to this second embodiment and vice versa), except that this embodiment further comprises options added of intermediate retainers, an additional second partition, and the partitions additionally include intermediate mounting tabs for the intermediate retainers.
Figure 12:
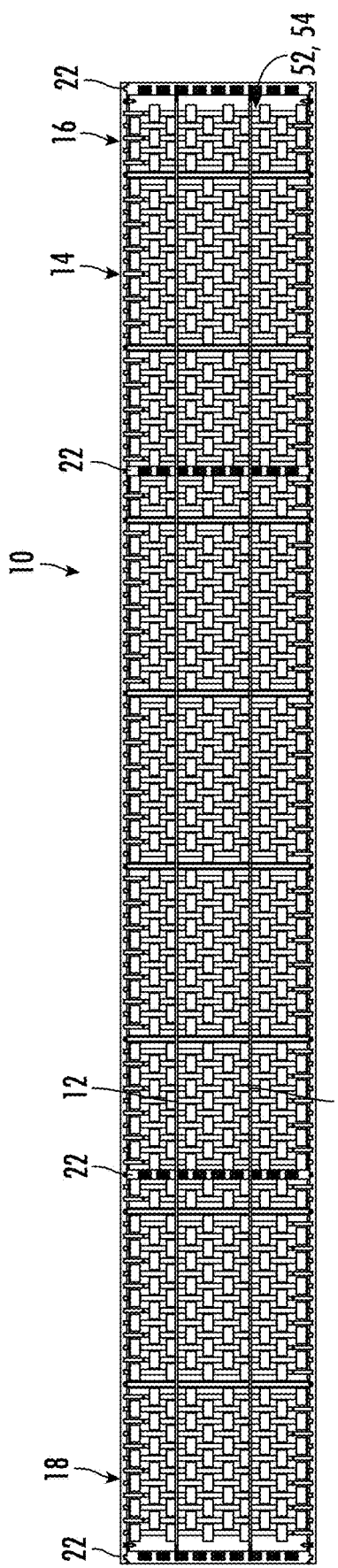
Figure 13:
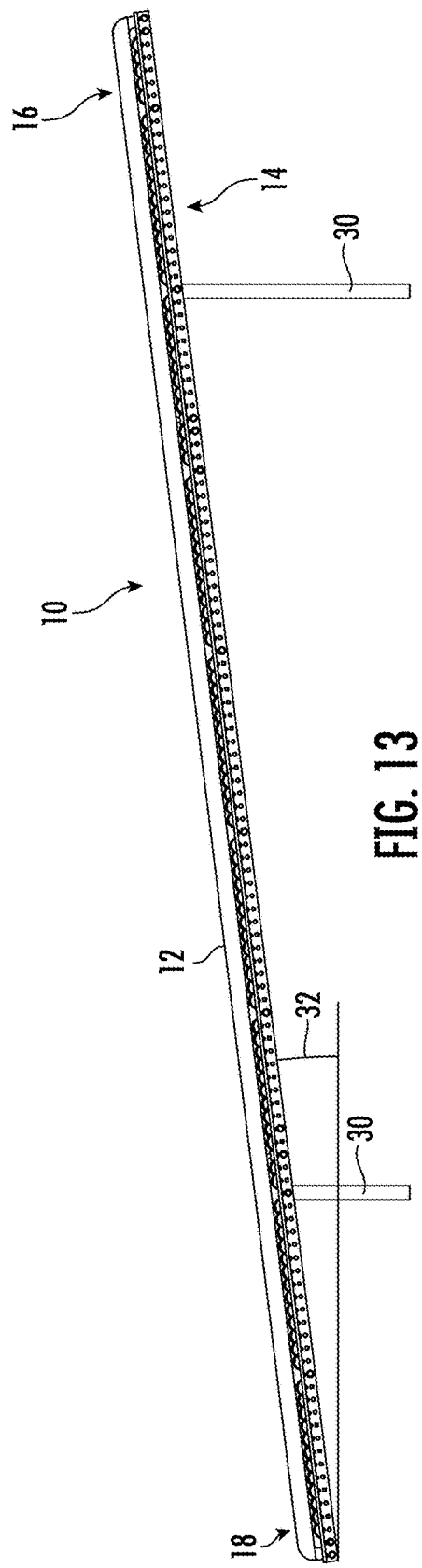
Figure 14:
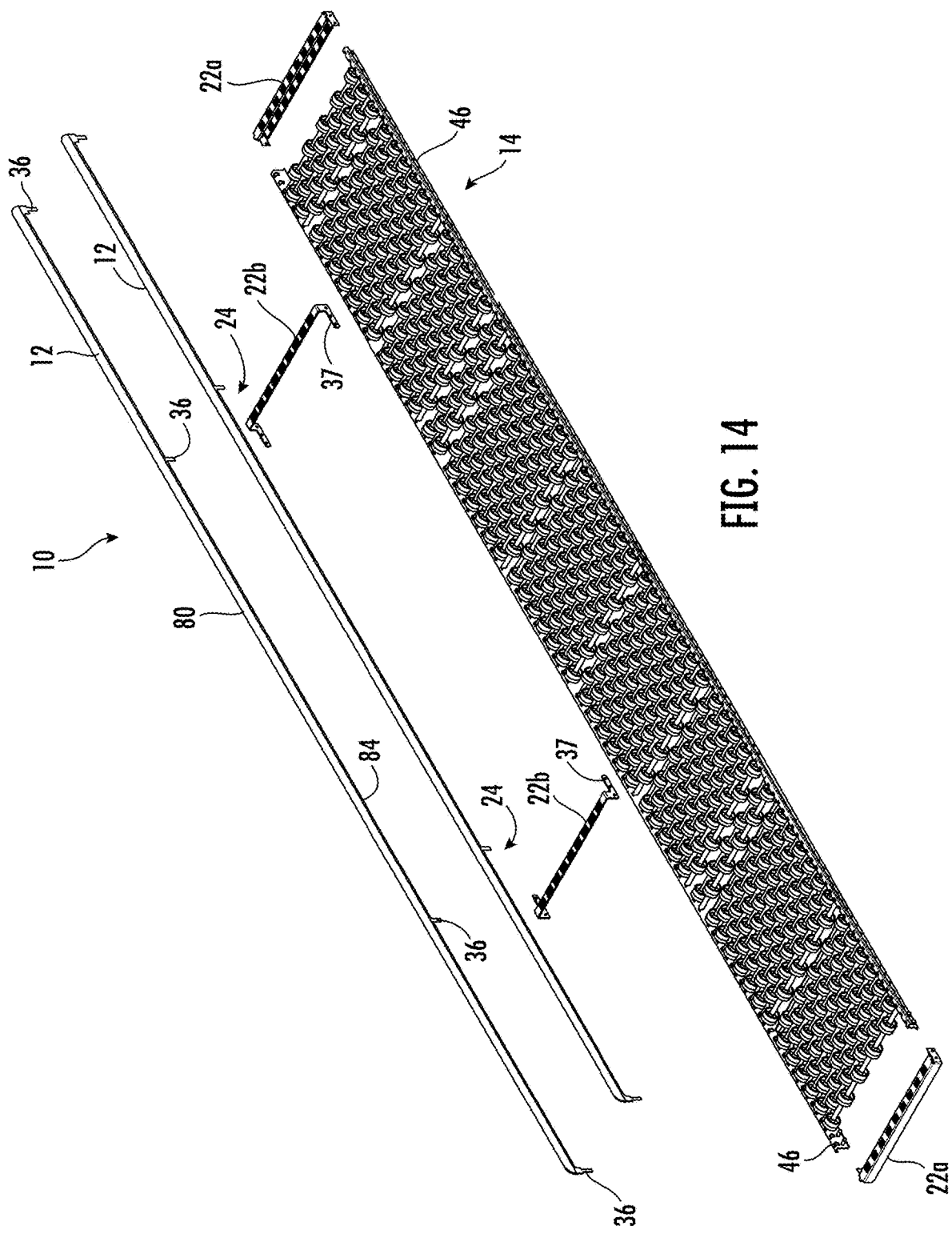
Figure 15:
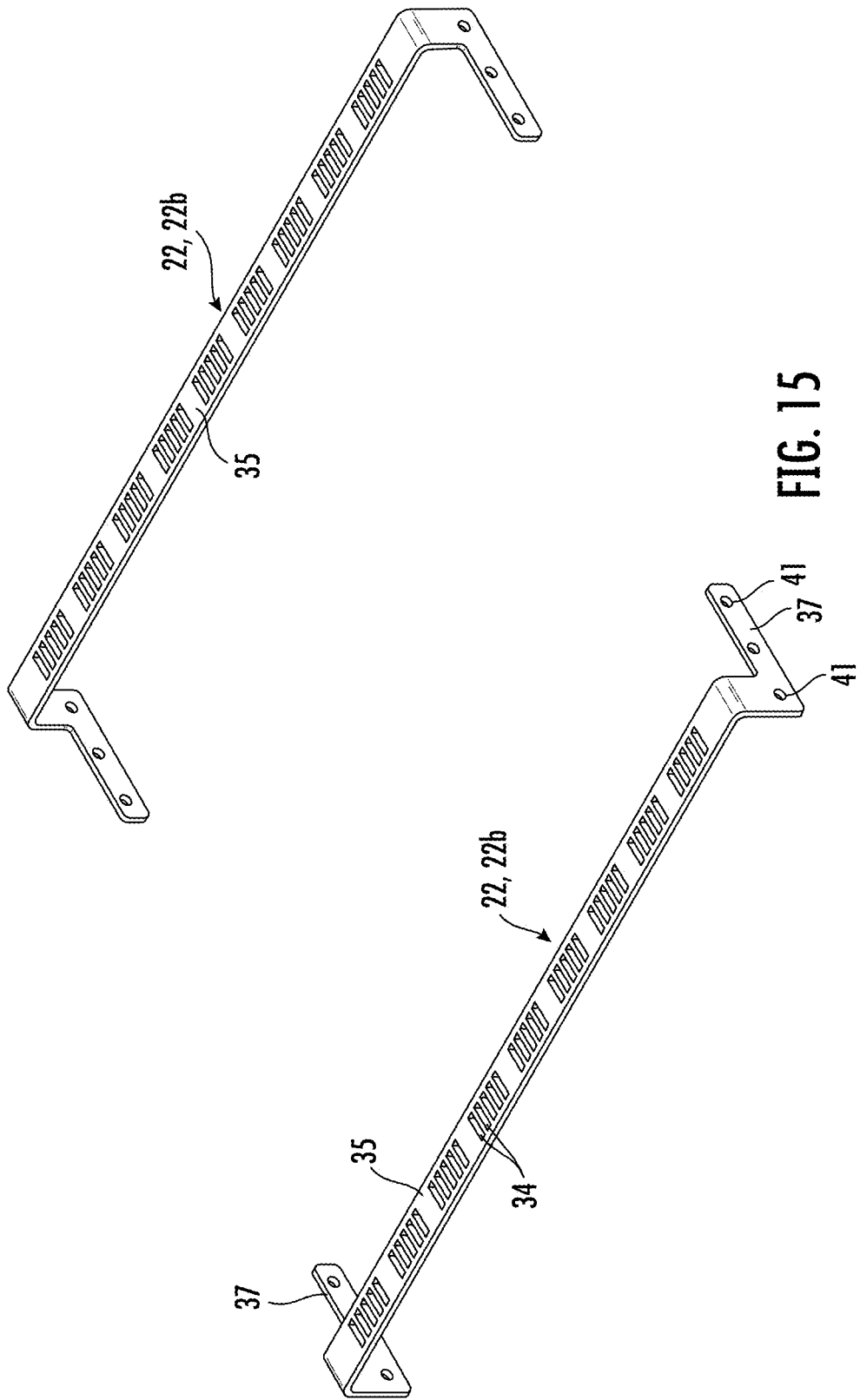
Figure 16:
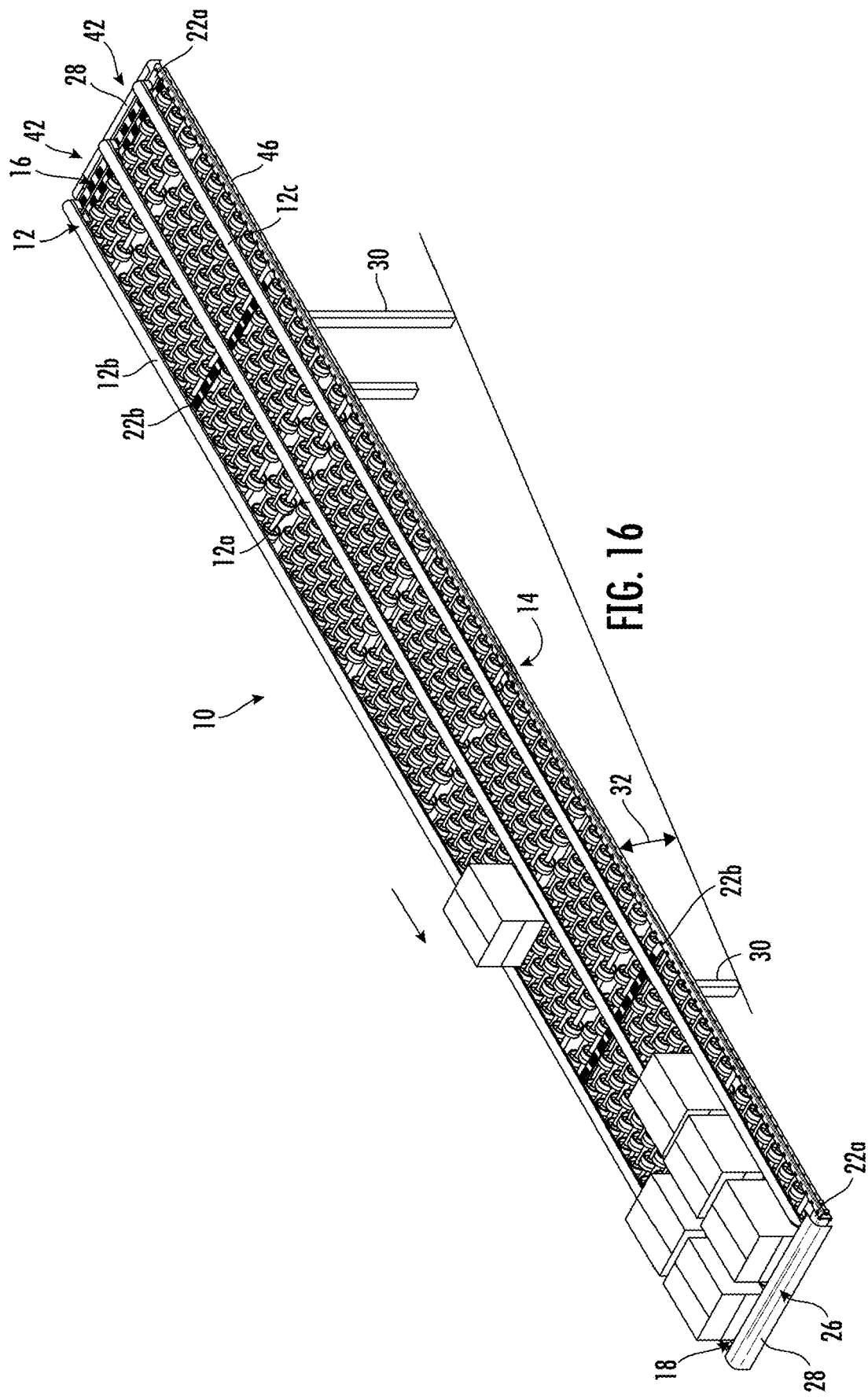
Figure 17:
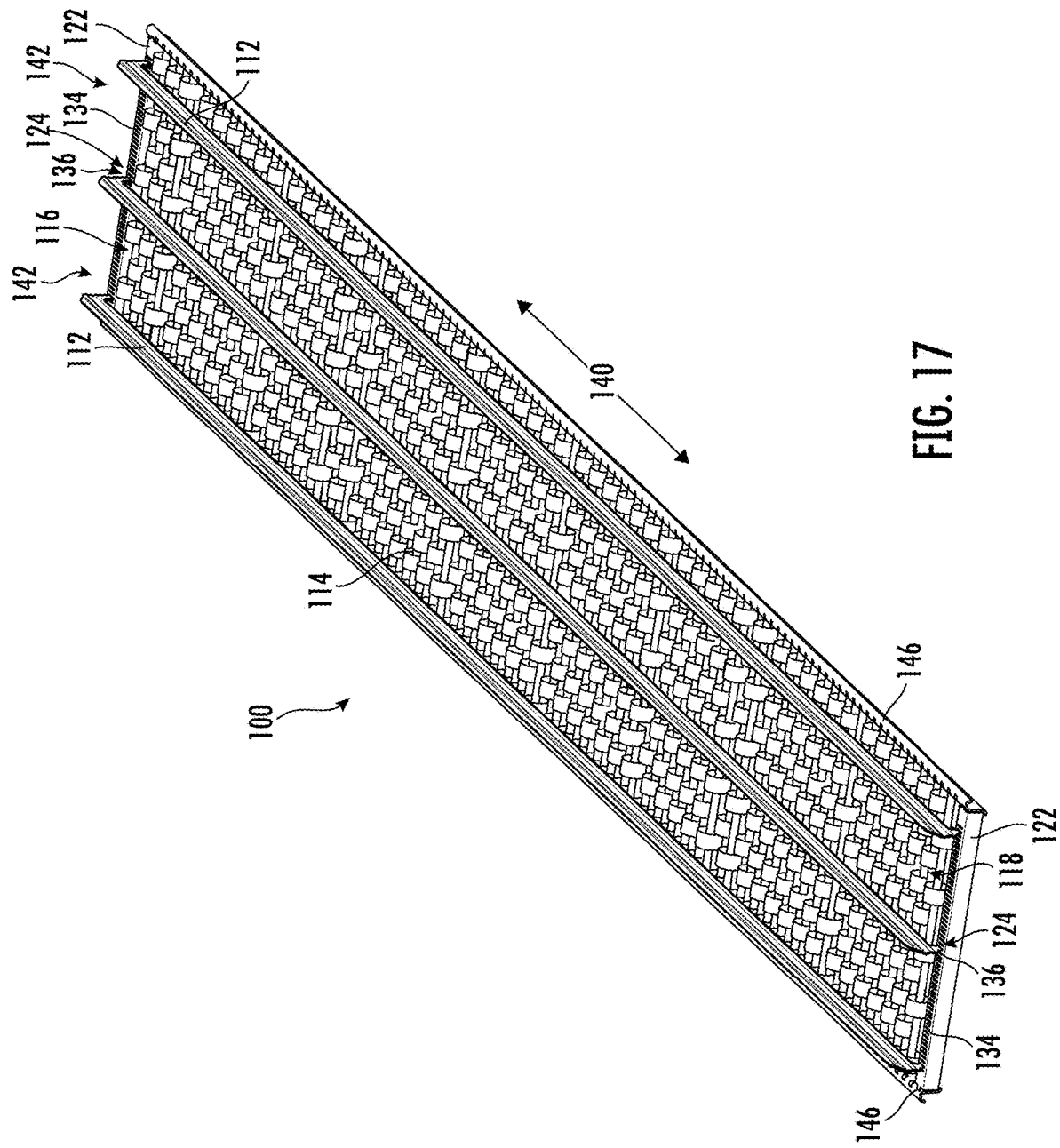
Figure 19:
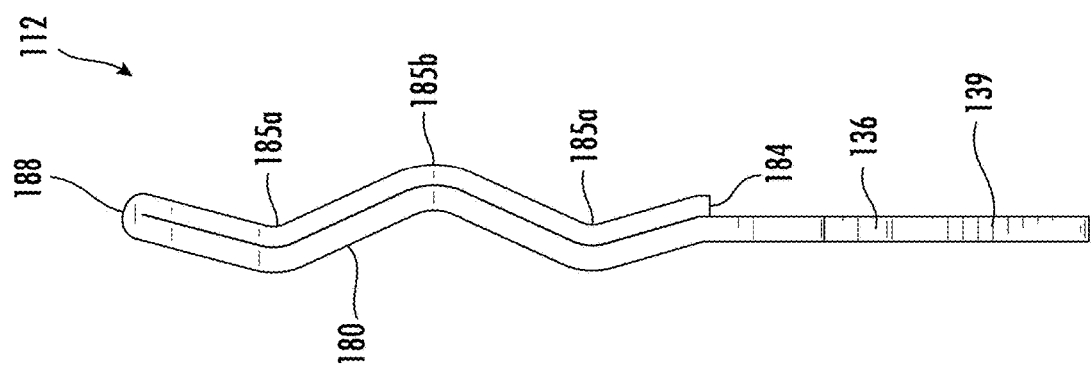
Figure 18:
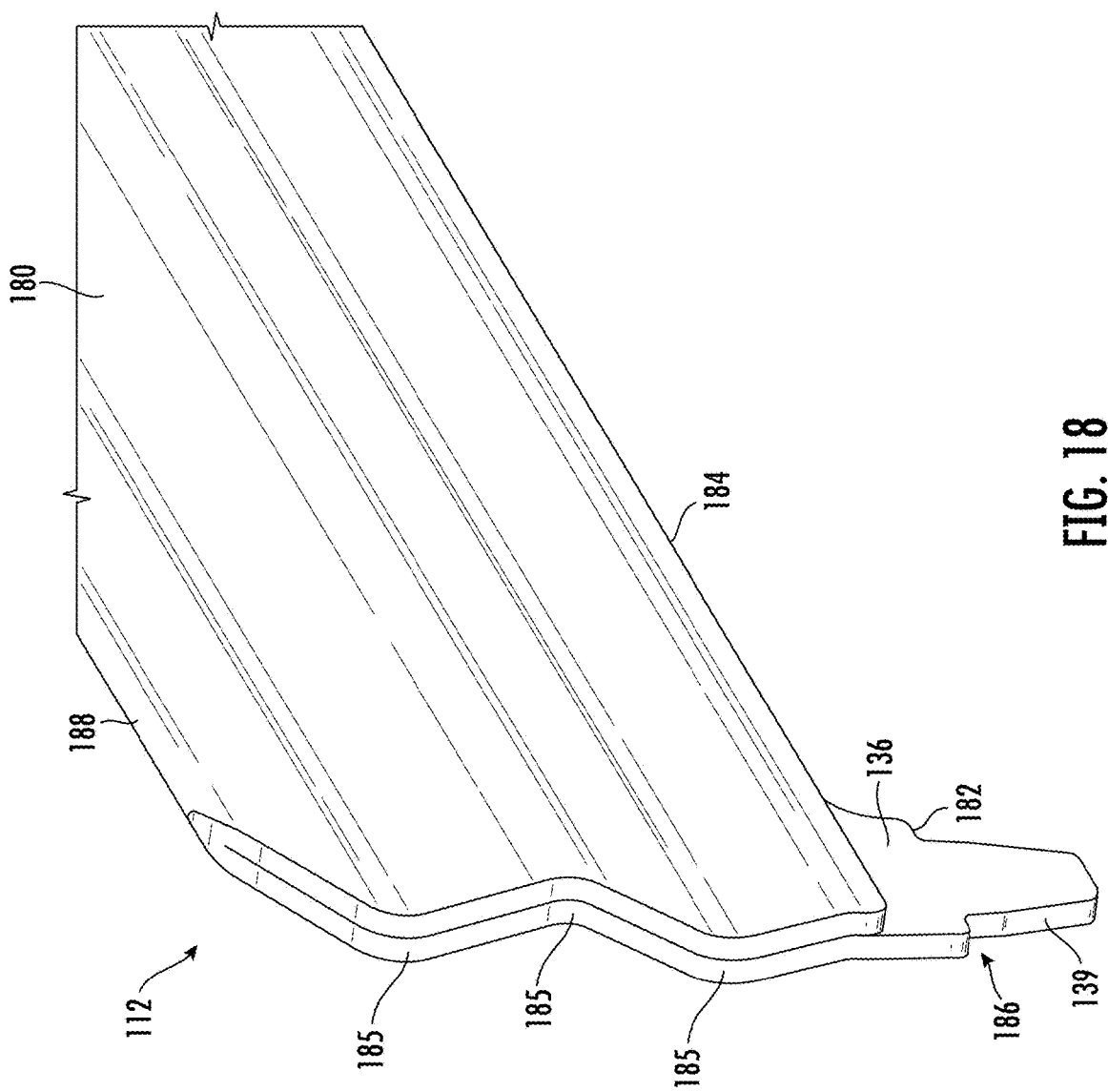
Figure 21:
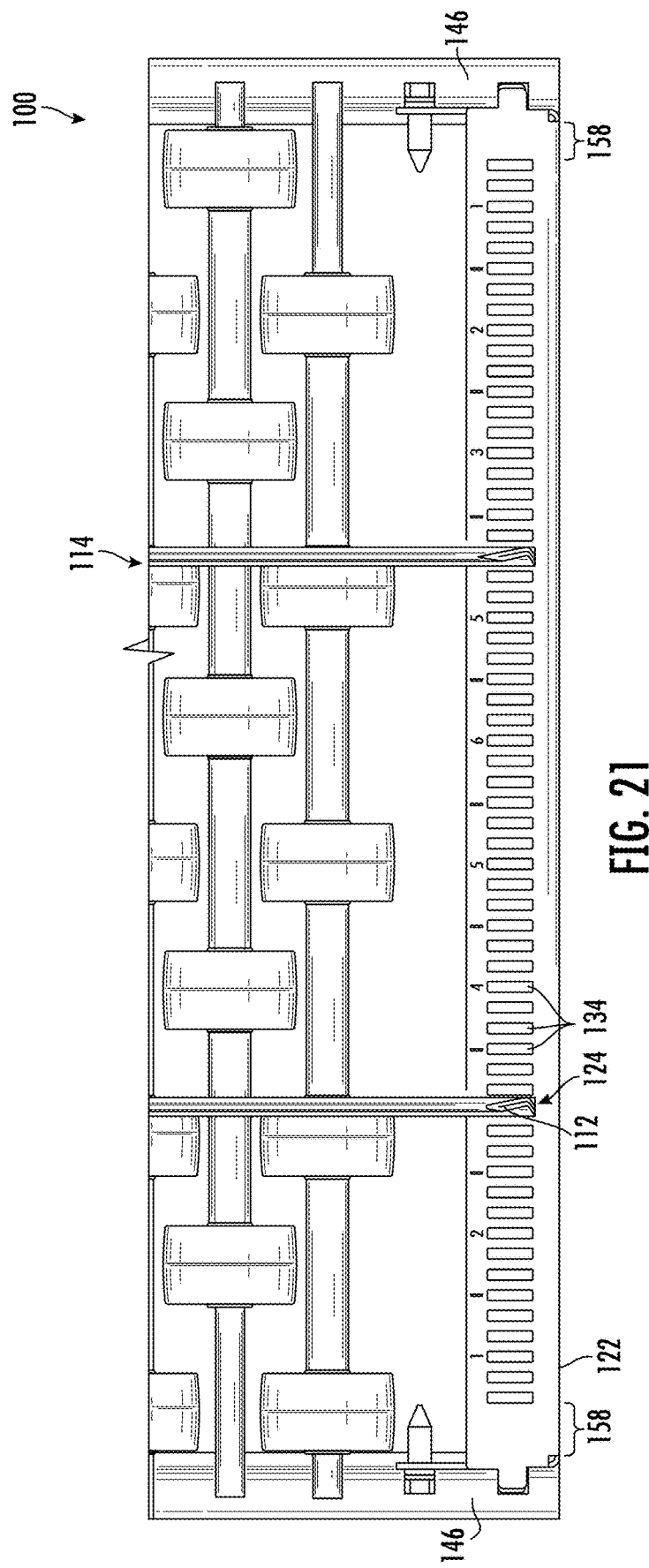
Figure 22:
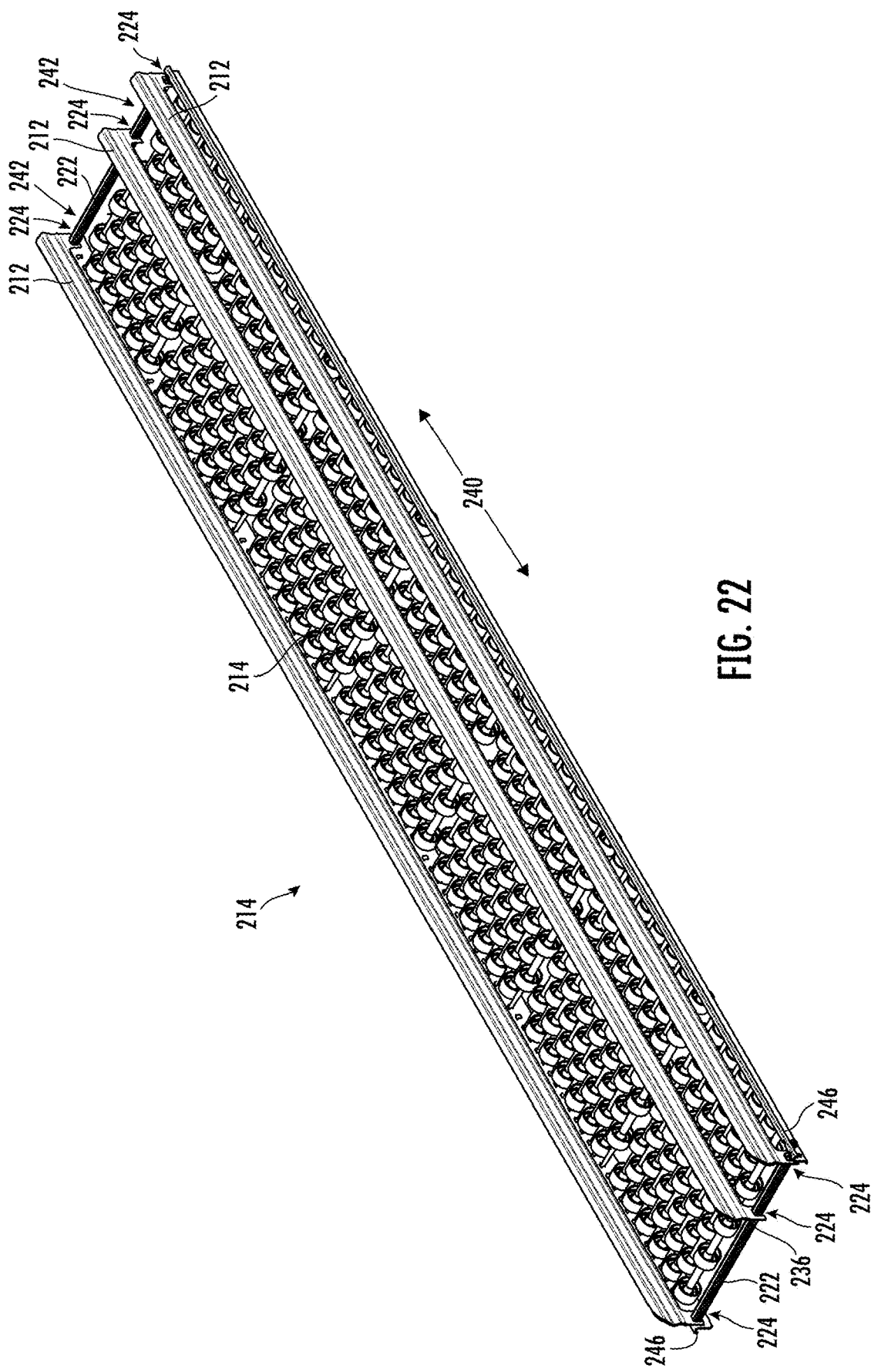
Figure 23:
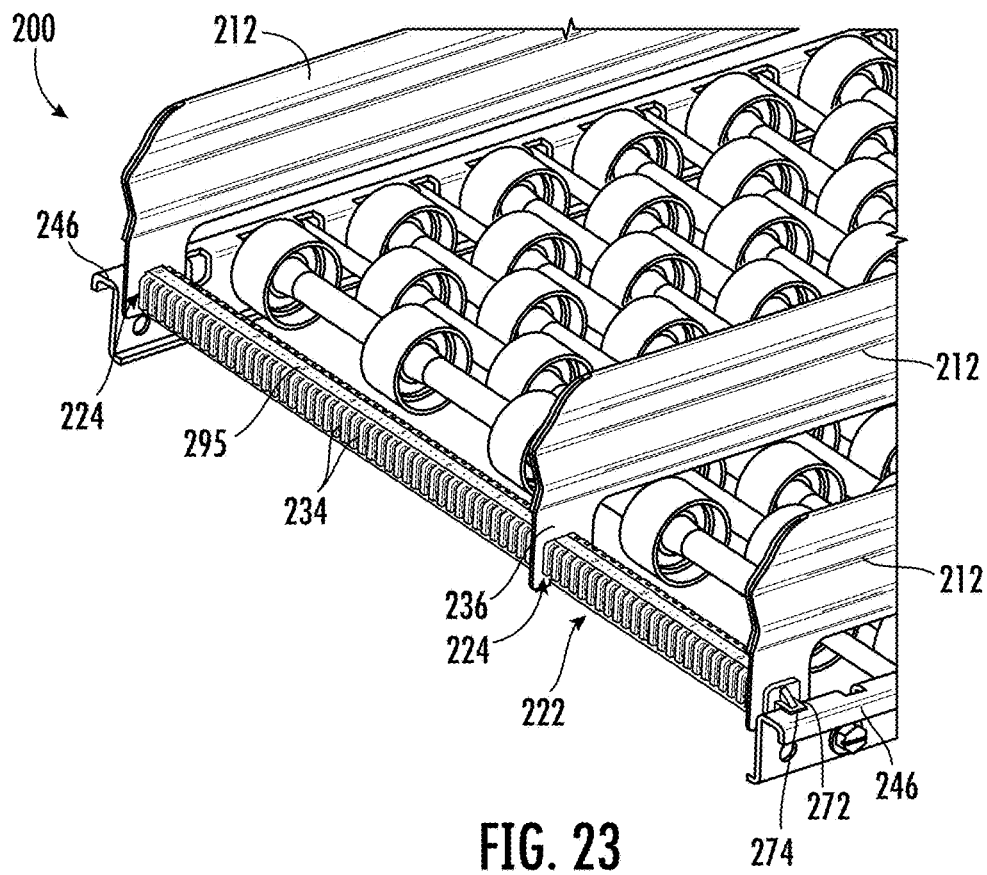
Figure 24:
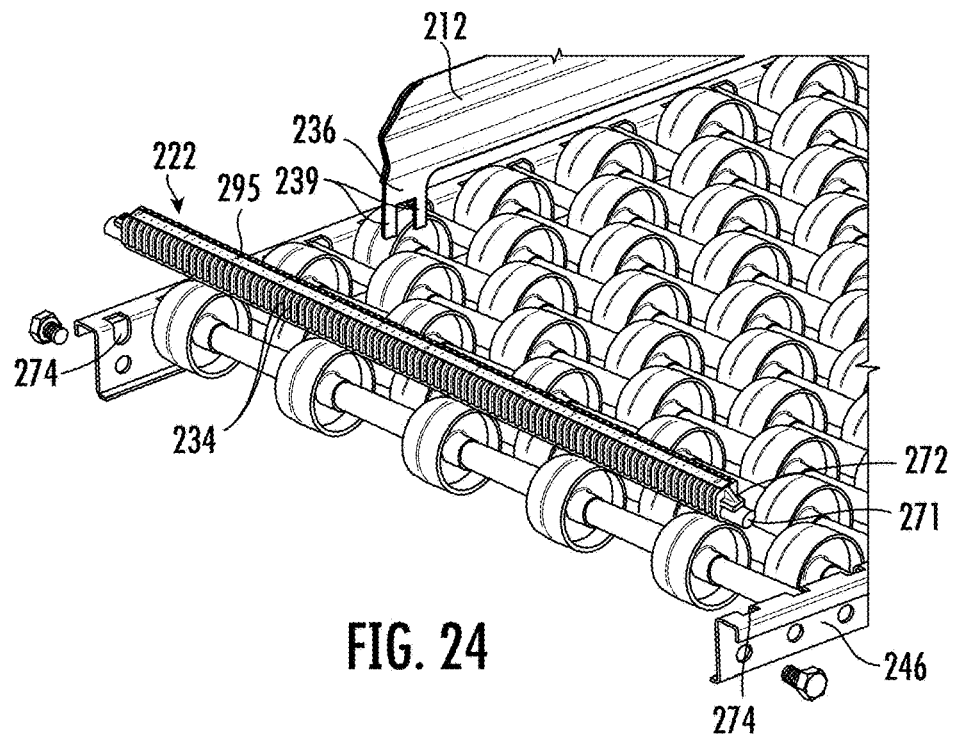
Figure 25:
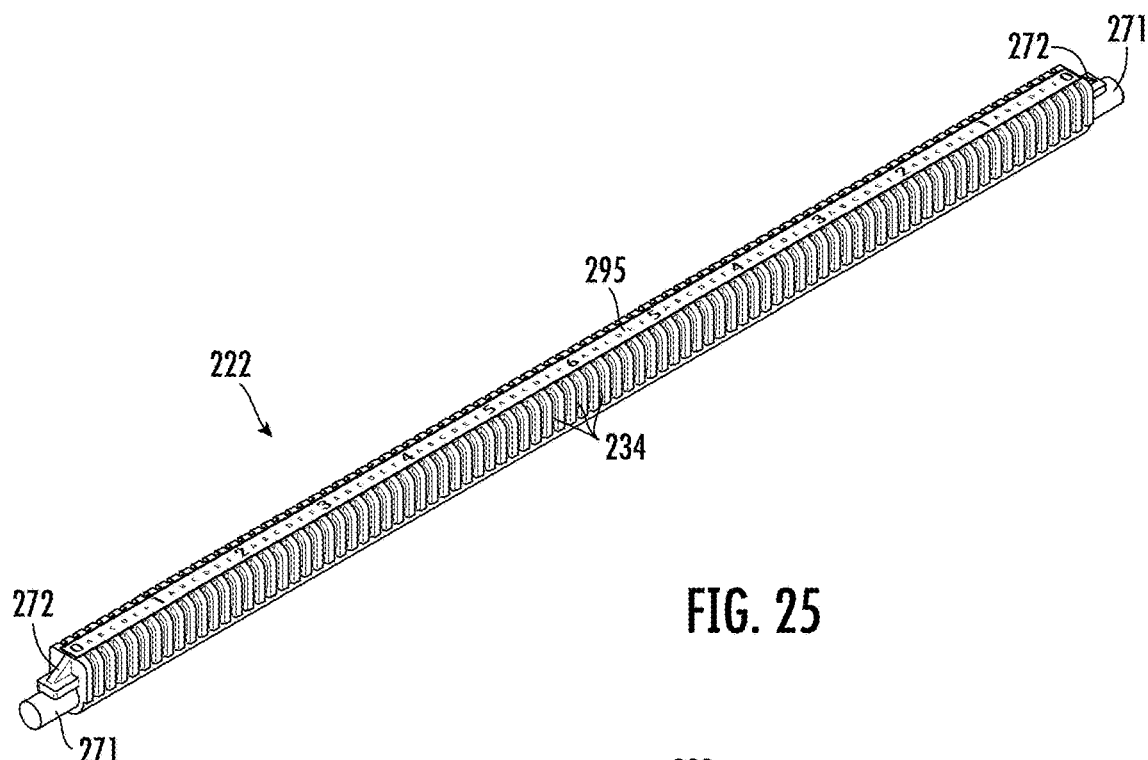
Figure 26:
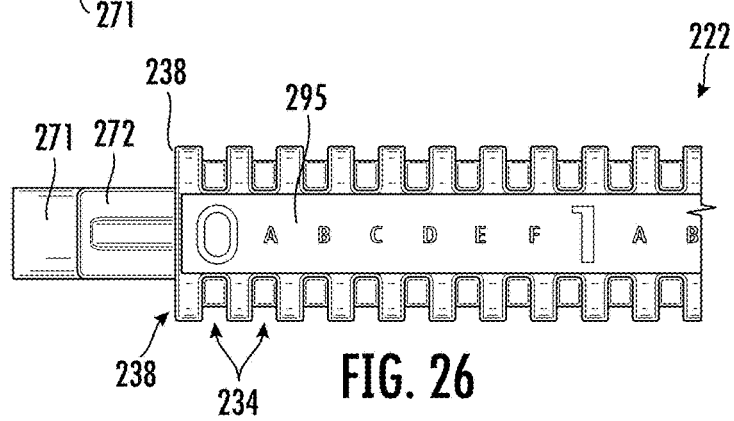
Figure 28:
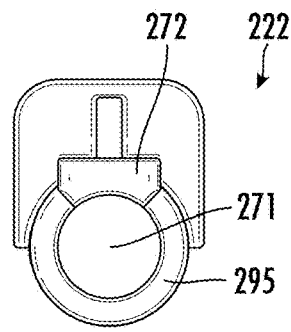
Figure 27:
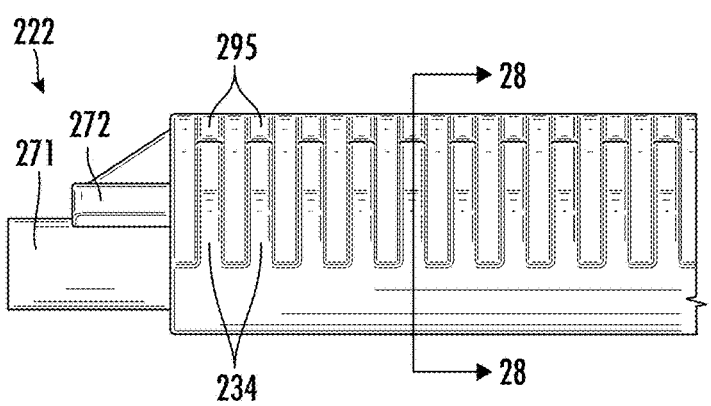
Figure 29:
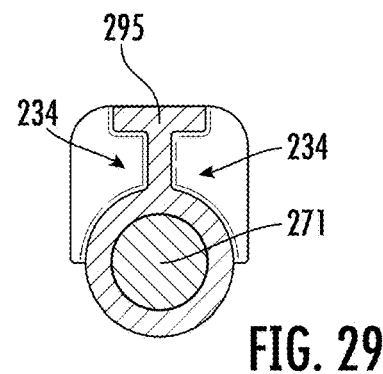
Figure 30:
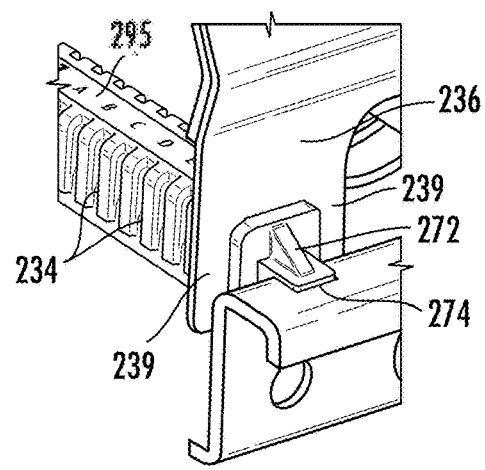
Figure 31:
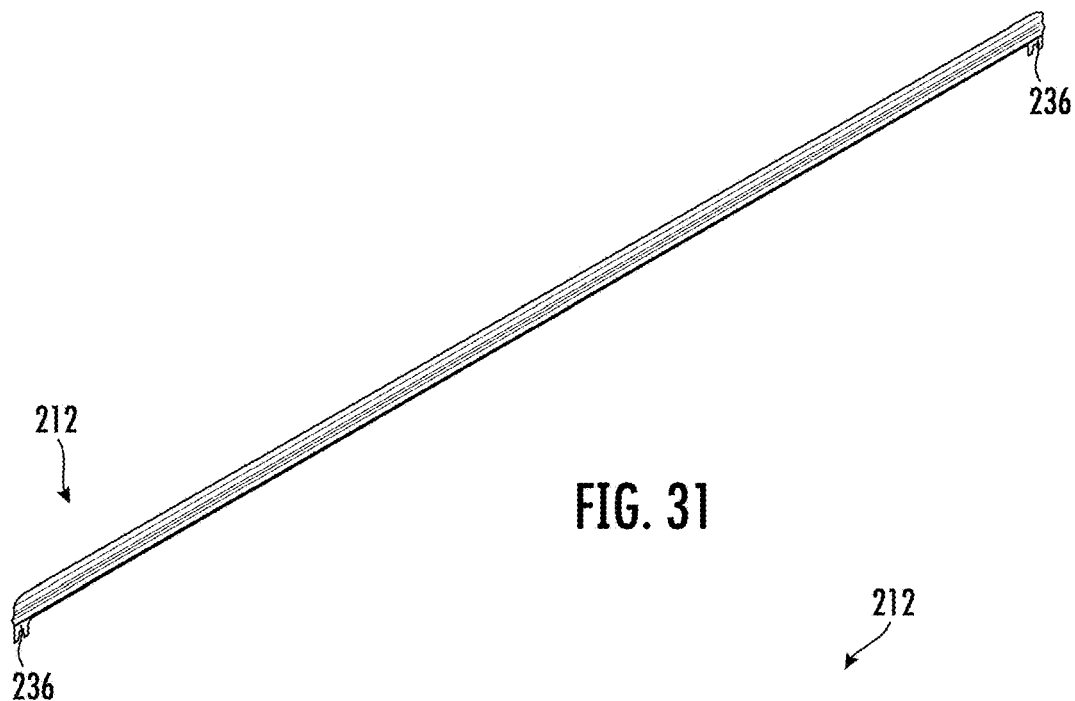
Figure 32:
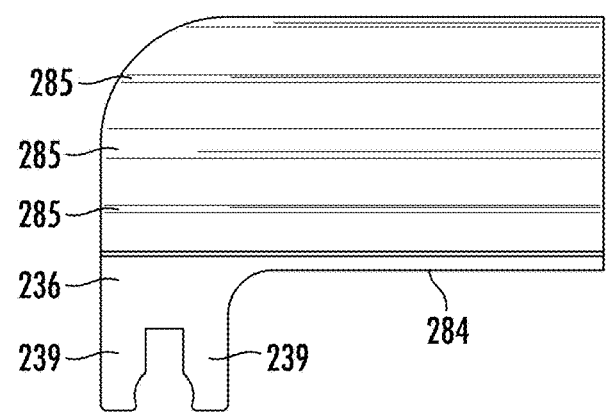
Figure 33:
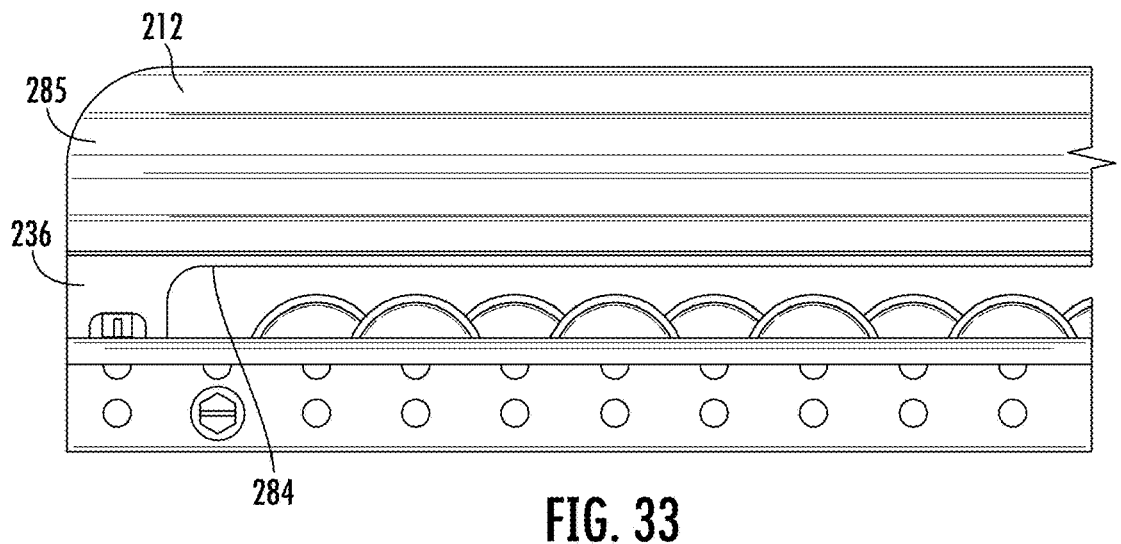
Figure 34:
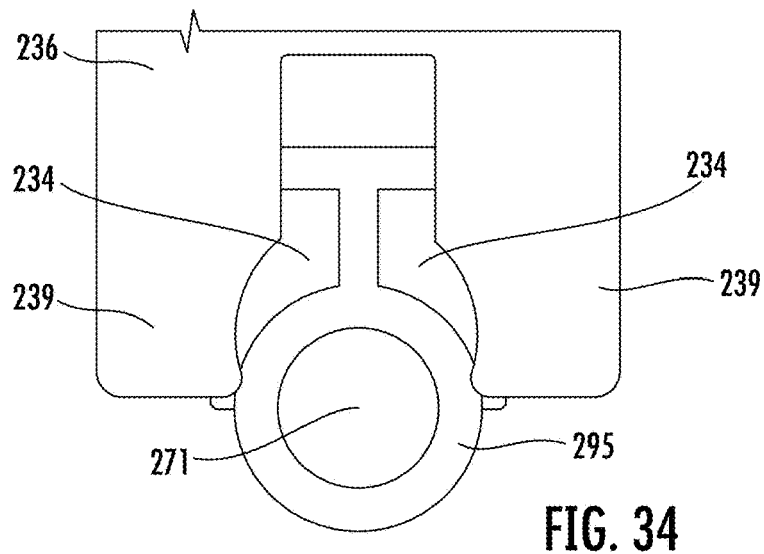
Figure 35:
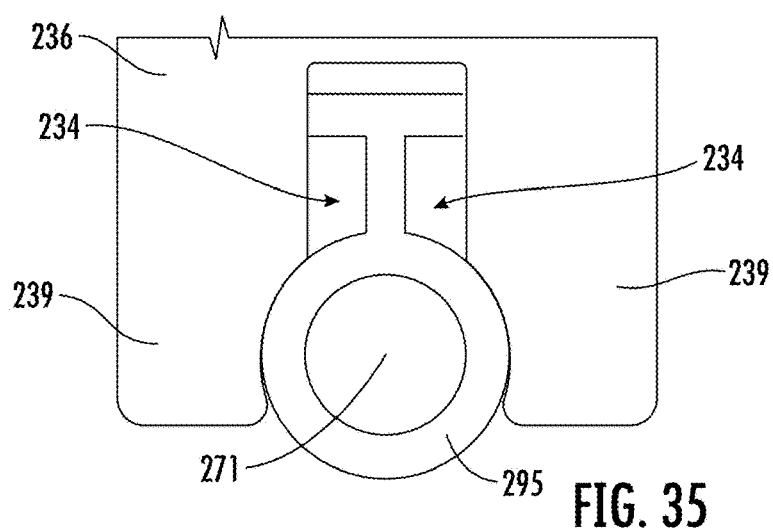

FIG. 12 is top plan view of the conveyor assembly shown in FIG. 11;

FIG. 13 is a side view of the conveyor assembly shown in FIG. 11 (also showing legs and slant angle for gravitational feed arrangement);

FIG. 14 is an exploded isometric assembly view of the conveyor assembly shown in FIG. 11;

FIG. 15 is an isometric view of the intermediate retainers that may optionally be used, such as may be shown FIG. 11 or 16;

FIG. 16 is an isometric view of conveyor assembly according to a third embodiment that is the same as that as either/both of FIGS. 1 and 11 embodiments (such that the disclosure and teachings of either/both of FIGS. 1 and 11 embodiments are applicable to this third embodiment and vice versa), with the further modification and addition to earlier embodiments showing the ability to provide outer partitions and at least one intermediate partition creating at least two lanes of adjustable size (and also showing the gravitational feed and end stop features that may be used also in other embodiments);

FIG. 17 is an isometric view of a conveyor assembly according to a fourth embodiment that is the same as that as FIGS. 1, 11, and 16 (such that the disclosure and teachings of FIGS. 1, 11, and 16 are applicable to this second embodiment and vice versa), except this embodiment further comprises corrugations along the partitions, and only one set of mounting slots on each retainer;

FIG. 18 is an isometric cut away view of one of the end portions of the partition used in the conveyor assembly of FIG. 17, it being understood that the end portions at opposite ends being the same configuration;

FIG. 19 is a side view of the partition used in the conveyor assembly of FIG. 17;

FIG. 20 is a detailed perspective view of a portion of the conveyor assembly of FIG. 17, showing the mounting interface;

FIG. 21 is a top view of an end portion of the conveyor assembly of FIG. 17;

FIG. 22 is an isometric view of a conveyor assembly according to a fifth embodiment that is the same as that as FIGS. 1, 11, 16, and 17 (such that the disclosure and teachings of FIGS. 1, 11, 16, and 17 are applicable to this second embodiment and vice versa), except this embodiment comprises an alternative mounting interface;

FIG. 23 is an isometric assembly view of one of the inlet/outlet end portions of the conveyor assembly of FIG. 22 with a partition mounted in place into the retainer, it being understood that the inlet/outlet ends are configured the same and are interchangeable;

FIG. 24 is an exploded isometric assembly view of one of the inlet/outlet end portions of the conveyor assembly of FIG. 22, it being understood that the inlet/outlet ends are configured the same and are interchangeable;

FIG. 25 is an isometric view of the retainer used in the conveyor assembly of FIG. 22;

FIG. 26 is a top view of an end portion of the retainer of FIG. 25, it being understood that the ends of the retainer are configured the same;

FIG. 27 is a side view of an end portion of the retainer of FIG. 25;

FIG. 28 is a end view of the retainer of FIG. 25;

FIG. 29 is a cross sectional view of the retainer of FIG. 27 taken along the line 29-29;

FIG. 30 is a detailed assembly view of an end portion of the retainer, rail, and partition of the conveyor assembly of FIG. 22;

FIG. 31 is an isometric view of the partition used in the conveyor assembly of FIG. 22;

FIG. 32 is a side cut away view of one of the end portions of the partition used in the conveyor assembly of FIG. 22, it being understood that the end portions at opposite ends being the same configuration;

FIG. 33 is a side view of a portion of the conveyor assembly shown in FIG. 22;

FIG. 34 is a detailed view of the mounting interface of the conveyor assembly shown in FIG. 22 with the mounting tab partially received in the mounting slot; and FIG. 35 is a detailed view of the mounting interface of the conveyor assembly shown in FIG. 22 with the mounting tab removably received in the mounting slot.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to FIGS. 1-16, embodiments of the invention has been shown embodied as a conveyor assembly 10. The conveyor assembly 10 facilitates ready adjustment via dividing the conveyor and/or creating one or more specific lane sizes with one or more partitions 12. In particular, different features, options and/or numbers of partitions which may be used in each of the embodiments of FIGS. 1, 11 and 16, with the same parts, such that the same reference numbers will be used throughout (and the teachings disclosures of each of the embodiments are applicable to the others unless otherwise indicated).

As exemplified by the figures, it will also be realized the same conveyor assembly may be initially configured and if desired readjusted so to accommodate different products and conveyor needs (e.g. to separate and organize specific product sizes).

As shown, the conveyor assembly 10, comprises a conveyor 14 including an inlet 16 and an outlet 18, and conveyor transport surface 20 extending between the inlet 16 and the outlet 18 (see e.g. conveyor transport surface 20 collectively created by wheels and best shown in FIGS. 9 and 10 by dashed lines). The conveyor assembly 10 also comprises retainers 22 which are supported by the conveyor 14 in spaced relation. Further, one or more partitions 12 extend between the retainers 22. Mountings interfaces 24 between the retainers 22 and the one or more partitions 12 facilitate removable support of each partition 12 by the retainers 22.

The inlet 16 and the outlet 18 may be configured the same (and thereby considered interchangeable and reversible such that outlet could be used as the inlet and the inlet as the outlet). In use, product is feed from the inlet 16 toward the outlet 18 as is common in in a warehouse, factory, retail location, shop floor or other location. However, product could also be reverse fed from the outlet toward the inlet in some uses.

In a gravitational feed arrangement as shown for example in FIG. 16 (see also FIG. 13), it is readily apparent which is the inlet and outlet, as the inlet 16 is raised vertically above the outlet 18 to facilitate gravitational product feeding from the inlet 16 to the outlet 18. Further, an end stop 26 (FIG. 16) may be provided for the conveyor 14 to stop product movement and retain product at the outlet 18 once the product reaches that location.

The end stop 26 may be provided by a frame member 28 that extends vertically above the conveyor transport surface 20 at the outlet 18 (the frame members 28 may also be provided at the inlet 16 and provide a similar end stop there if ever needed). The frame members 28 (or portion thereof) may extend across and support several conveyors and may be considered to be part of the conveyor assembly 10. For example, frame members 28 may also support one or more conveyor assemblies 10 in side by side relation (each that may or may not have retainer/partition arrangements for adjustable sized lanes, and in which a lane may extend partially onto an adjacent conveyor). Further the conveyor assembly(s) 10 can be slanted with support legs 30 that may be adjustable to adjust angle 32 between the inlet 16 and the outlet 18 as shown in FIGS. 13 and 16. Such support legs 30 and slant angle 32 can be provided also in the FIGS. 1 and 11 embodiments (see e.g. also FIG. 13 for gravitational feed arrangement of the conveyor). Typically, the slant angle 23 is between 2 and 20 degrees, but most typically between f and 10 degrees.

For most gravitational feed conveyor applications, the slant angle of a gravitational feed arrangement as shown in FIG. 16 will be at an angle relative horizontal of between 3 and 20 degrees between the inlet 16 and the outlet 18 (more typically between 5 and 10 degrees).

Each mounting interface 24 is preferably arranged vertically below the conveyor transport surface 20 at that location so as not to interfere therewith such a shown best in FIGS. 9-10. This may be facilitated by the top surface 33 of the retainers 22 below the conveyor transport surface 20, for example by at least 0.5 centimeter. In this manner the mounting interface 24 and retainers 22 are mounted in a way so as to avoid and/or limit restricting or frictionally engaging product that moves along the conveyor transport surface 20.

As shown in the figures (shown best in FIGS. 2-5 with additional reference to FIGS. 6-10), the mounting interfaces 24 can comprise mounting slots 34 and mounting tabs 36. The mounting slots 34 are configured to removably receive the mounting tabs 36.

While the reverse is possible and encompassed by the broader claims appended hereto, preferably the mounting slots 34 are provided by the retainers 22 and the mounting tabs 36 are provided by the one or more partitions 12. This configuration may make easier configuration of the partitions 12 (for example they may be more easily configured as flat panels of sheet metal as shown).

Furthermore, to facilitate more adjustability in how a worker divides the conveyor 14, each retainer 22 comprises a row 38 of the mounting slots 34. The row 38 extends transversely relative to a longitudinal span 40 of the conveyor 14 between the inlet 16 and the outlet 18. For example, the one or more partitions 12 can be moved laterally (e.g. perpendicular to the longitudinal span 40) between different positions to segment, divide and/or segment and divide the conveyor transport surface 20 into one or more lanes 42 of select width.

Different means may provide for the conveyor transport surface 20 such as a low friction flat sheet slide surface (not shown) or as shown wheels 44 (which term is meant to be broad to include anything that rotates such as rollers, cylinders, discs, etcetera). Preferable, wheels 44 are used, which collectively the uppermost portions thereof (e.g. uppermost contact points/tangent lines of the wheels) provide the conveyor transport surface 20, best shown in FIGS. 9-10 with dashed lines.

For example, as shown in the embodiments, the conveyor 14 comprises: (a) a pair of rails 46 extending parallel to the longitudinal span 40 in spaced relation; (b) a plurality of rods 48 extending transversely between the rails 46; and with (c) the wheels 44 supported by the rods 48 for rotation relative to the rails. With this arrangement, the conveyor transport surface 20 is provided collectively by the uppermost contact locations of wheels 44.

Multiple wheels 44 are preferably supported by each rod 48. Further the wheels 44 may be of relatively short width, which can provide a functional advantage as discussed below.

Also, the wheels rotate relative to the rods through bearings and/or the rods 48 rotate relative to the rails 46. However, preferably the wheels 44 rotate independent of each other and relative to the rods 48 which also can provide a functional advantage as discussed below. For example, bearings may be provided between each wheel the rod upon which it is carried for rotation.

The wheels 44 may be arranged in spaced relationship laterally into a plurality of wheel rows—as shown. In particular, the wheel rows extend longitudinally between the inlet 16 and the outlet 18 in parallel relationship with the rails 46. This creates rows 52 of gaps 54 that are free of the wheels 44 (see FIG. 7). As shown, the rows 52 of gaps 54 extend longitudinally between the inlet and the outlet in parallel relationship with the rails.

Furthermore, it can be arranged that the mounting slots 34 are aligned with the rows 52 of gaps 54. This arrangement can locate the relevant partition 12 in a desirable way to prevent a wheel 44 from acting on both sides of that partition 12. In particular, if a partition were to be centralized over a wheel 44, a package stopped in a lane 42 on one side of the partition 12 (see e.g. FIG. 16) would inhibit movement of such centralized wheel on another lane 42 on the other side of the partition 12. This might be a situation if several packages are stopped in end to end relation extending from the outlet toward the inlet in one of the lanes 42 as shown in FIG. 16. Those stopped packages weigh and frictionally engage those wheels 44 in that lane 42 inhibiting rotation of those wheels 44 (including any wheels that would be split between lanes), such that it is not desirable for any wheel to share two different lanes at the same time.

Therefore, there is an advantage by arranging such that partitions 12 via the mounting interfaces 24 such that any wheel 44 is only acting in one lane 42 at a time.

The mounting slots 34 may be arranged in a series of sets 56 spanning between the rails 46, with each set 56 comprising at least two of the mounting slots 34 (for example each set 56 has five mounting slots 34). Each set 56 is respectively aligned with one of the rows 52 of gaps 54. Further, each retainer 22 defines a series of solid non-slotted segments 58 (e.g. solid segments) defined between adjacent members of the sets 56 of gaps 54.

To provide more enhanced support, each retainer 22 (at least the end retainers 22*a*) comprises an upper panel 60 and a lower panel 62 arranged in spaced relationship. The upper and lower panels 60, 62 respectively defining upper and lower slots 64, 66 that are in alignment to provide the mounting slots 34. While both upper and lower slots 64, 66 may provide enhanced support, it is understood that either the upper slots 64 or lower slots 66 alone can provide mounting slots 34. When both upper panel 60 and lower panel 62 are used (with upper and lower slots 64, 66), the mounting tabs 36 can pass through both of the upper panel 60 and the lower panel 62 providing more support and better retention and rigidity during operation of the partition(s) 12 supported thereby.

Each retainer 22 (i.e. each end retainer 22a) includes a U-shaped channel 68 further comprising a connecting panel 70, with the connecting panel 70 spacing apart and joining between the upper panel 60 and the lower panel 62. From this configuration, the end retainer 22 may readily be stamped formed from sheet metal.

The U-shaped channel 68 may further comprise location tabs 72 on opposite sides. The location tabs 72 engaging with cutouts 74 in space relation that formed into the rails 46 of the conveyor 14. Further, the U-shaped channel 68 may have bent ends that form end panels 76 joined to at least one of the panels (60, 62, 70). Fasteners 78 (e.g. screws, bolts and nuts, or rivets or the like) can secure the end panels 76 and thereby the U-shaped channels 68 to the rails 46.

While one partition 12 is shown in FIG. 1, more typically at least two partitions 12 as shown in FIGS. 11 and 16 embodiments are used to create one or more lanes 42 between such partitions 12, which are of adjustable size as the partitions are readily movable between slots to adjust size.

As shown in FIG. 16, the partitions 12 may include outer partitions 12a, 12b and at least one intermediate partition 12c creating at least two lanes 42 of adjustable size.

While the retainers can be positioned at different locations, preferably the retainers 22 are at or proximate ends (i.e. on opposite sides of the media) to include opposite inlet and outlet end retainers 22a such as an inlet retainer in a region of the inlet 16 and an outlet retainer in a region of the outlet 18 as shown.

The retainers 22 may optionally include one or more intermediate retainer(s) 22b for additional support as shown in the embodiments of FIGS. 11 and 16 (FIG. 1 embodiment only has end retainers 22a shown, but intermediate retainers could be added). Each intermediate retainer 22b positioned intermediate of the end retainers 22a. Further, a tab and slot mounting interface 24 engages between each intermediate retainer 22b and each partition 12 in such embodiments of FIGS. 11 and 16. This feature may be used for longer conveyor lengths (for example over six feet in length) to provide additional rigidity to each partition 12, such as may be the case as is shown in FIGS. 11 and 16. However, for shorter conveyor lengths (for example under six feet) intermediate retainers 22a may not be needed, such as may be the case as is shown in FIG. 1.

For example, the partitions 12 may optionally include intermediate mounting tabs 36 to mate with the intermediate mounting slots 36 of the intermediate retainers 22b in FIGS. 11 and 16 embodiments. Further as shown in FIG. 15, the intermediate retainers 22b, can be differently configured with only a single panel 35 of mounting slots 34 as opposed to two panels of aligned slots 64, 66 in the end retainers 22a. The mounting for the intermediate retainers 22b also provide an alternative arrangement with longitudinally extending bracket arms 37 extending from the panel 35, each with a series on mounting holes 41 to facilitate mounting to the rails 46 of the conveyor 14 (such as via fasteners 78).

The intermediate retainers 22b of FIG. 15 may alternatively be used as the end retainers 22a and in place of the end retainers 22a such as shown in FIG. 1. Likewise the end retainers 22b and design thereof with top and bottom panels may also be used as intermediate retainers. Different retainer configurations and mounting interface configurations can be utilized based upon the amount of support needed that may depend upon the application (e.g. weight of product/packages being employed), the length of the conveyor and other considerations.

While not limited thereto, typical dimensions of conveyors for warehouse/shop/manufacturing location, the conveyor's longitudinal span 40 (e.g. length of the rails) may comprise multiple feet (including 6 feet or more for longer conveyors and under 6 feet for short conveyors); and the conveyor's width (perpendicular to the span 40 and between inward facing surfaces of the rail 46—e.g. the length of the retainers 22 without the tabs 72) may be one foot or more (frequently multiple feet).

Preferably, the embodiments are configured into gravitational feed conveyors such as shown in the embodiments of FIGS. 13 and 16 with the inlet 16 elevated vertically relative to the outlet 18 to facilitate gravitational transfer between the inlet toward the outlet. Typically, there is an end stop 26 as may be provided by the frame 28 (or other such stop member that can be secured at the outlet) as discussed above positioned at the outlet 18 to stop packages thereat.

In such an arrangement, the outlet end retainer 22a may be positioned at an end of the outlet 18, for example between the end stop 26 and the wheels 44 (i.e. downstream of all of the wheels 44). Also, the inlet end retainer 22a may be positioned at an end of the inlet 16 upstream from all of the wheels 44.

Further optional features may be provided for the partitions 12 as discussed below.

Figure 3:
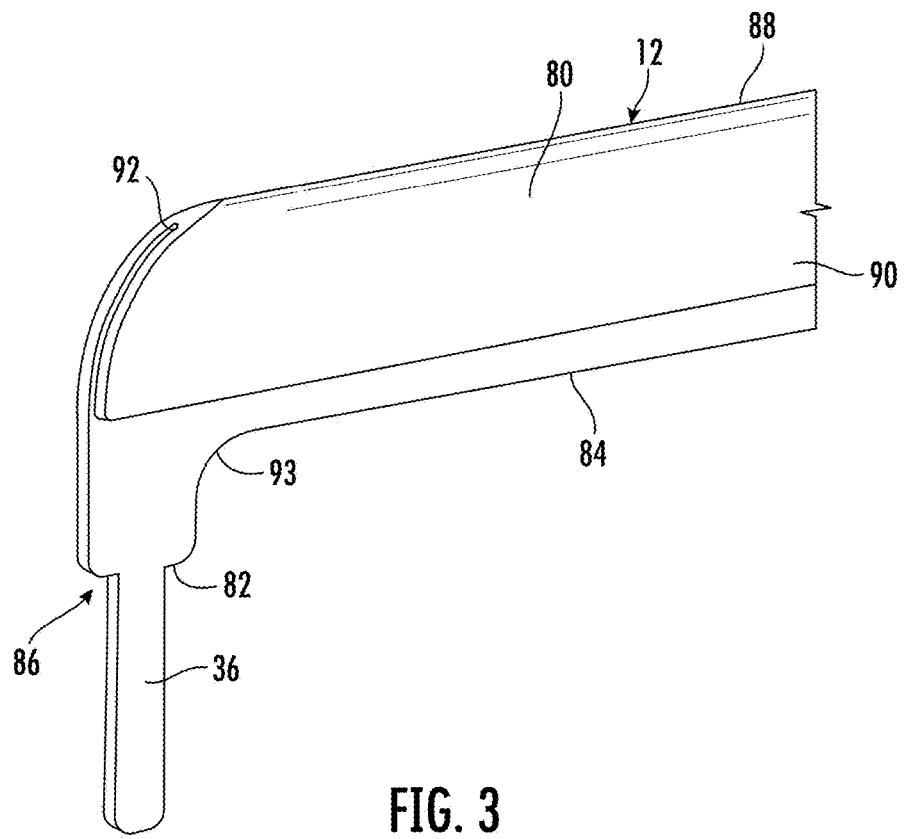
FIG. 3 is an isometric cut away view of one of the end portions of the partition used in the conveyor assembly of FIG. 1, it being understood that the end portions at opposite ends being the same configuration.
Figure 7:
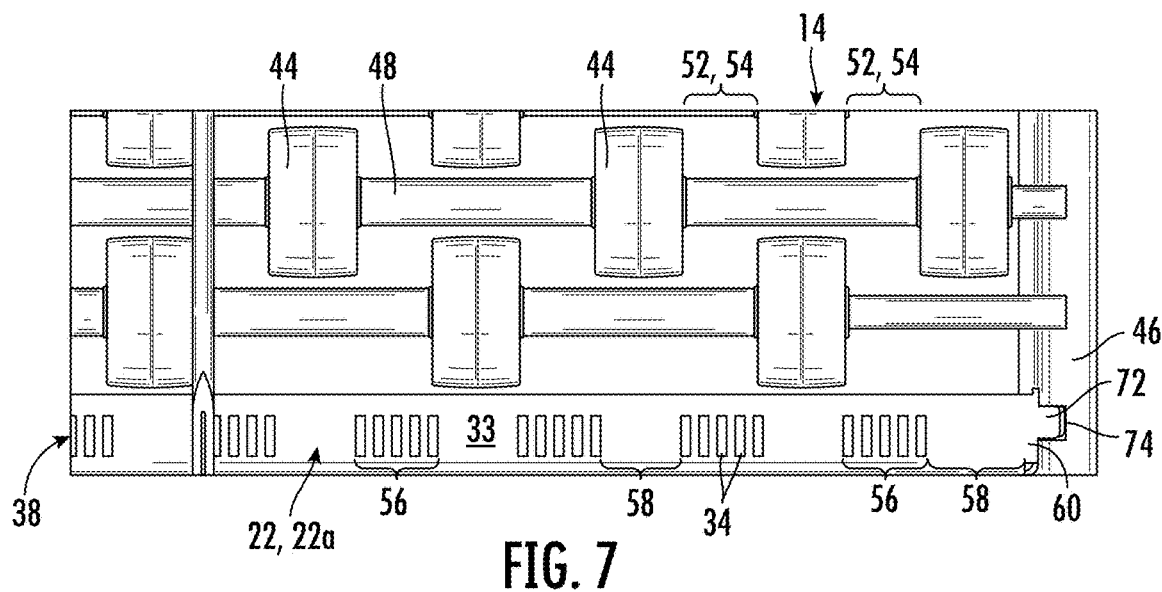
FIG. 7 is an enlarged top view a corner end portion of the conveyor assembly shown in the prior figures.
Figure 8:
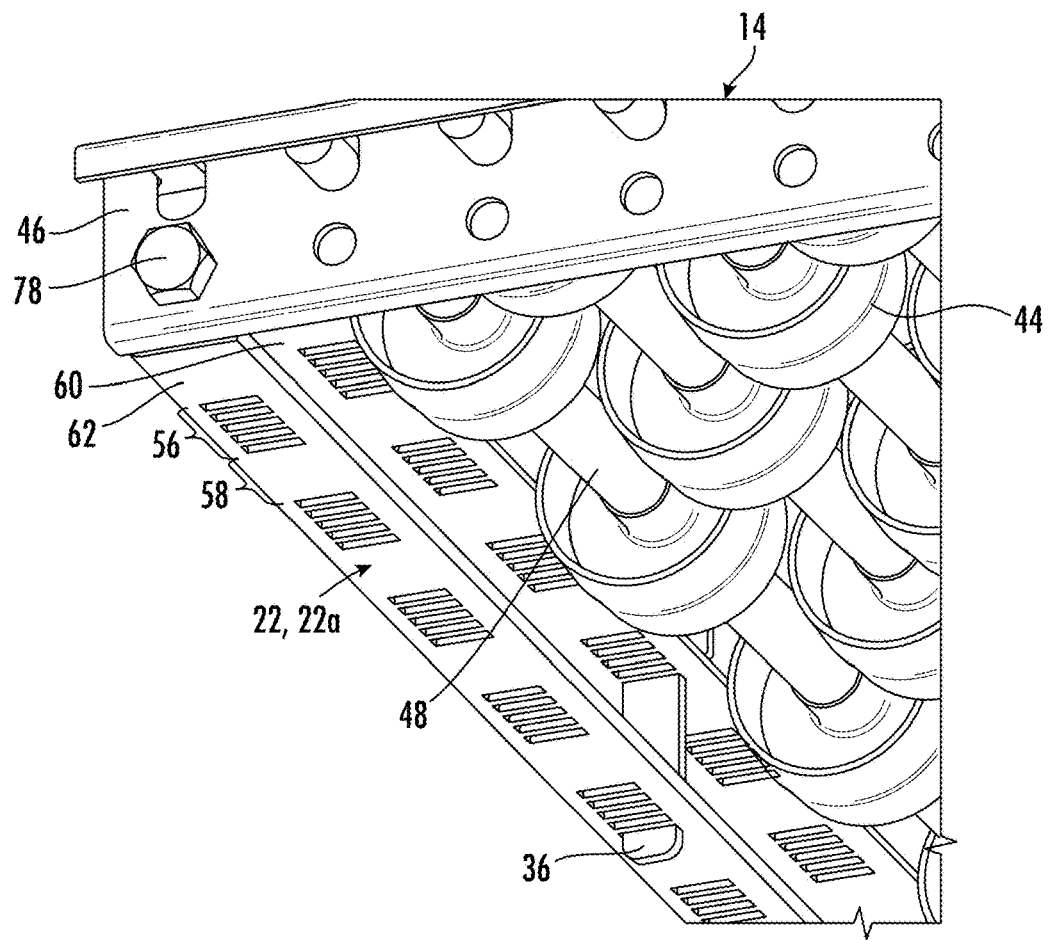
FIG. 8 is an isometric angled underside view of the corner of the conveyor assembly of the prior figures better showing one of the retainers with one of the partitions therein.

As shown in FIGS. 3 and 9, each partition a partition wall 80 extending between the inlet 16 and the outlet 18. Each partition 12 may further including abutments 82. The abutments 82 engage the retainers 22, respectively, in order to space the partition wall 80 vertically from the conveyor transport surface 20 without contact therebetween. This can provide the bottom edge 84 of the partition wall 80 elevated that is elevated and thereby spaced above conveyor transport surface 20 (for example the bottom edge 84 might be at least 0.5 centimeter above the conveyor transport surface 20 to ensure appropriate clearance). Further this feature allows the same partition to be used for different wheel conveyor products that may have differently sized wheels and therefore clearances (for example the gap spacing would allow larger diameter wheels to be used without having to change the configuration of the partition due to the clearance between the bottom edge 84 of the partition wall 80 and the conveyor transport surface 20 (facilitated by the top contacts of the wheels). Thus, the configuration of the partition allows the partition to be used against different conveyor product configurations for different applications.

When the partition 12 defines mounting tabs 36, the mounting tabs may depend downwardly form the partition wall 80, and each mounting tab 36 may include a step 86 to provide for the abutments 82. The partition wall 80 and the mounting tabs 36 are provided by a unitary sheet metal panel as shown.

Another feature is that each partition 12 can be made from sheet metal material without a sharp upper edge, but instead the sheet material may be folded over as shown in FIG. 3 to creating a smooth radiused tip 88 along the top edge thereof with a hem portion 90 that extends toward the body edge 84. The steps 86 and corner regions 92, 93 which merges into the mounting tabs 36 can be radiused in a manner to avoid pointed corners. This better ensures product are not damaged during movement on the conveyor in created lanes. Further, the creation of the hem portion 90 creates overlap and a metal channel type structure while even though relatively thin and narrow substantially increases the rigidity of the partitions 12 as they extend longitudinally between the inlet and the outlet that can eliminate or reduce the need for intermediate retainers 22b.

The figures also demonstrate a method of use involving dividing the conveyor 14. The method comprises: arranging one or more partitions 12 at location laterally between the rails 46 of the conveyor 14 in parallel relationship with the rails 46; and removably retaining the one or more partitions 12 to the conveyor 14 among different locations.

Advantageously, the removably retaining can be accomplished with simple sliding in and out action, typically without need for disassembly and without tools needed. It can be readily done repeatedly with different positioning and repositioning possible.

The method of use can involve at least two partitions 12 as shown in FIGS. 11 and 16, which can further involve creating at least one lane 42 of adjustable size with the at least two partitions 12.

The method of use contemplates adjusting the size of the at least one lane 42 by repositioning at least one of the partitions 12 on spaced apart retainers 22 that perform the removably retaining function.

As shown in FIG. 16, the method of use may involve use of outer partitions 12a, 12b and at least one intermediate partition 12c, and creating at least two lanes 42 of adjustable size with the outer partitions 12a, 12b and the at least one intermediate partition 12c.

In use, the size of the at least two lanes 42 can be adjusted by repositioning one or more of either or both of the outer partitions 12a, 12b and the at least one intermediate partition 12c on spaced apart retainers 22 that perform the removably retaining function.

Turning to FIGS. 17-21, conveyor assembly 100 is shown and described, according to a further embodiment with some additional features that may be used. Conveyor assembly 100 is substantially the same as conveyor assembly 10, except as discussed herein. The teachings and disclosures of this embodiment are applicable to the embodiments of FIGS. 1, 11, 16 and 22, and vice versa, unless otherwise indicated. In particular, conveyor assembly 100 includes partitions 112. Partitions 112 are like partitions 12, except that partitions 112 include at least one corrugation such as a plurality of corrugations 185, which provide support for partitions 112. Corrugations 185 provide rigidity, which allows for partitions 112 to extend further conveyor lengths without the using intermediate retainers 22b to maintain better rigidity. In this way, only end retainers are used even for longer lengths.

As shown, conveyor assembly 100 includes retainers 122 which are supported by conveyor 114 and extend between rails 146. One or more partitions 112 extend between retainers 122. In this embodiment, three partitions 112 are shown and used to create one or more lanes 142 between partitions 112.

Mounting interfaces 124 between the retainers 122 and partitions 112 provide removable support between each partition 112 and retainer 122. Mounting interfaces 124 include mounting slots 134 and mounting tabs 136. The mounting slots 134 are provided along the retainer 122, and the mounting tabs 136 are provided at each end of partition 112. In this way, each partition 112 includes at least two mounting tabs 136. Similar to partitions 12, partitions 112 can be used to create lanes of adjustable size and are readily movable between slots 134 to adjust lane size and/or location along conveyor 114.

Each partition 112 includes a partition wall 180 that extends between inlet 116 and outlet 118 along a longitudinal span 140 of conveyor 114. Partition wall 180 includes a smooth radiused tip 188, a bottom edge 184 opposite from radiused tip 188, and at least one corrugation and typically a plurality of corrugations 185 to provide additional rigidity. Corrugations 185 allow for partition wall 180 to extend greater lengths without the need for additional support structures, such as intermediate retainers 22b. Corrugations 185 are located between radiused tip 188 and bottom edge 184 creating grooves/ridges which alternate directions. Partition wall 180 has preferably has more than one corrugation and more typically at least two corrugations. For example, as shown in FIG. 19, partition wall 180 includes three corrugations 185. Two corrugations 185a create grooves/ridges in a first direction, and one corrugation 185b creates a groove/ridge is a second direction opposite from the first direction.

Mounting tabs 136 depend downwardly from partition wall 180. Mounting tabs 136 are similar to mounting tabs 36, except that mounting tabs 136 are larger. That is, mounting tabs 136 have a greater width than mounting tabs 36. Steps 186 may also have a greater width to provide a larger abutment 182. Additionally, mounting tabs 136 include a tapered section 139 that extends down from steps 186. In this way, tapered section 139 narrows mounting tabs 136 allowing for simple insertion and removal of tabs 136 into slots 134 of retainers 122.

Retainers 122 are like retainers 22, except that retainer 122 comprises a row 138 of mounting slots 134 with only one set of mounting slots 134, and slots 134 are configured to be larger to receive tabs 136. Row 138 extends between rails 146 and transversely to the longitudinal span 140 of conveyor 114. Mounting slots 134 in row 138 are spaced from rails 146 by non-slotted segments 158 (e.g., solid segments) such that the mounting slots 134 extend between two non-slotted segments 158. Each non-slotted segment 158 is located adjacent to each rail 146. Individual mounting slots 134 are configured to receive tabs 136 and may have a greater length, relative to longitudinal span 140 of conveyor 114, in order to receive the greater width of tab 136. In this way, when mounting tabs 136 are removably received in mounting slots 134, it creates a mounting interface 124 similar to mounting interface 24.

Additionally, as shown, reference characters (e.g. reference numbers and/or letters such as shown in FIG. 26) are shown FIGS. 20-21 that may be used, and which can either be printed or stamped and/or punch out into each inlet and outlet retainer 22. This allows for easier indexing and relocation of partitions, by workers. For example, two workers at opposite inlet and outlet ends can tell each other which slot the partition is being inserted so that they can insert into commonly aligned slots more easily to create the desired lane size.

Turing to FIGS. 22-35, conveyor assembly 200 is shown and described according to another exemplary embodiment. Conveyor assembly 200 is substantially the same as conveyor assemblies 10 and 100, except as discussed herein. The teachings and disclosures of this embodiment are applicable to the embodiments of FIGS. 1, 11, 16 and 17, and vice versa, unless otherwise indicated. In particular, conveyor assembly 200 includes an alternative mounting interface 224.

As shown, mounting interface 224 includes mounting slots 234 and mounting tabs 236. Mounting slots 234 are configured to removably receive mounting tabs 236. Mounting slots 234 are divided into rows 238 by a central projection 295 (which projection 295 also may act as segmented mounting tabs as shown be received in a corresponding mounting slots formed between prongs in the mounting tabs as shown). Mounting tabs 236 be of a fork configuration and include prongs 239 so that mounting tabs 236 engage mounting slots 234 on both sides of central projection 295.

Retainers 222 extend between rails 246 transversely to a longitudinal span 240 of conveyor 214. Each retainer 222 engages with rails 246 to secure the retainer 222 in place along conveyor 214. To facilitate retention with rails, retainer 222 can include a central rod 271 and a location tab 272. Location tab 272 extends from central projection 295 and may be made unitary with central projection 295. A sleeve may provide the central projection 295 and the location tab, with a central rod 271 projecting trough a central hole in the sleeve. Central rod 271 extends through central projection 295 (as shown in FIG. 29). Rails 246 include cutouts 274 configured to receive and retain central rod 271 and location tab 272. In this way, retainer 222 may be secured between rails 246. An advantage of this design is that the cutouts 274 are the same cutouts used for wheel mounting such that no further modification of rails is necessitated to mount the retainers, and different rain and retainer lengths can readily be cut for the desired width and/or length of conveyor.

This also has the advantage of employing a combination of materials including a sleeve (e.g. central projection 295 that may include location tab 272) that can be injection molded plastic material, whereas the central rod 271 can be a steel rod. In earlier embodiments, preferably the retainers are stamped formed sheet metal.

Mounting slots 234 are provided by retainers 222. Mounting slots 234 are evenly spaced along the length of retainer 222 between each rail 246. Central projection 295 is centered on retainer 222 and extends along the length of retainer 222. Mounting slots 234 are divided into two rows 238 by central projection 295. Central projection 295 includes a rounded portion, which surrounds central rod 271, and a t-shaped portion, which extends from the rounded portion.

As shown, partitions 212 include mounting tabs 236 at each end. Partitions have corrugations 285 similar to corrugations 185. Partitions 212 are used to create one or more lanes 242. In this embodiment, three partitions 212 are shown and used to create two lanes 242 of different sizes.

Mounting tabs 236 have a pronged/forked configuration which includes prongs 239. Prongs 239 are configured to engage mounting slots 234 and central projection 295. Each prong 239 is received in mounting slots 234 on each side of central projection 295. Prongs 239 are shaped to match at least a portion of central projection 295. Specifically, prongs 239 include a first width and a second width. Second width is greater than first width and configured to engage the rounded portion of central projection 295. Further, prongs 239 include concave bends which engage the rounded portion of central projection 295. Changing the location of the concave bends can allow for bottom edge 284 of partition 212 to be elevated and thereby spaced above conveyor 214.

Mounting interface 224 may also include a snap feature on mounting tabs 236 as shown in FIG. 34 in that the width at the mouth of the mounting tabs 236 (at the end between prongs) is narrower than the maximum width of the sleeve/central projection 295. The mouth of the mounting tabs 236 then widens out to match the profile of the sleeve/central projection 295. Snap feature may be provided on the ends of mounting tabs 236 (and/or via resiliency in the material of the sleeve/central projection 295 for example such as via plastic material) to assist in retaining mounting tabs 236 in mounting slots 234 and around central projection 295.

For example, in this embodiment, referring to FIGS. 34, 25 snap feature is facilitated by radially outward bending movement of the prongs 239 which flexibility is facilitated by the relatively thin nature of mounting tabs and the slot formed therein, and/or radially inward compression of the plastic material of sleeve/central projection 295. As a result, as shown in FIG. 34 the snapping action occurs in what is shown in overlapped region therein, which is actually stretched (not shown) until the mouth of the mounting tabs 236 passes by the outer radius and widest region of the sleeve/central projection 295 and becomes relaxed again as shown in FIG. 35 which snap action more securely holds the partitions to the retainers. The width of the mouth can be just slightly smaller than the maximum width of the sleeve/central projection 295 as shown in FIG. 34 thereby facilitating this feature.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A conveyor assembly, comprising:
   a conveyor including an inlet and an outlet, and a conveyor transport surface extending between the inlet and the outlet;
   a plurality of retainers supported by the conveyor in spaced relation;

at least one partition extending between the retainers;
mounting interfaces between the retainers and the at least one partition facilitating removable support of each partition by the retainers; and
wherein each partition is formed from a sheet metal panel that is of folded construction creating a smooth radiused tip along the top edge thereof.

2. The conveyor assembly of claim 1, wherein the mounting interfaces comprise mounting slots and mounting tabs, with the mounting slots configured to removably receive the mounting tabs.

3. The conveyor assembly of claim 2, wherein the mounting slots are provided by the retainers and the mounting tabs are provided by the at least one partition.

4. The conveyor assembly of claim 3, wherein each retainer comprises a row of the mounting slots that extends transversely relative to a longitudinal span of the conveyor between the inlet and the outlet, wherein the at least one partition can be moved laterally between different positions to segment, divide or segment and divide the conveyor transport surface into one or more lanes of select width.

5. The conveyor assembly of claim 4, wherein:
the conveyor comprises: (a) a pair of rails extending parallel to the longitudinal span in spaced relation; (b) a plurality of rods extending transversely between the rails; and (c) a plurality of wheels supported by the rods for rotation relative to the rails, the conveyor transport surface provided collectively by the wheels; and
wherein the wheels are arranged in spaced relationship laterally into a plurality of wheel rows with the wheel rows extending longitudinally between the inlet and the outlet in parallel relationship with the rails creating rows of gaps that are free of the wheels, the rows of gaps extending longitudinally between the inlet and the outlet in parallel relationship with the rails; and
wherein the mounting slots are aligned with the rows of gaps to prevent a wheel from acting on both sides of the at least one partition.

6. The conveyor assembly of claim 1, wherein each partition comprises a partition wall extending between the inlet and the outlet, each partition furthering including abutments, the abutments engaging the retainers, respectively in order to space the partition wall vertically above the conveyor transport surface without contact therebetween.

7. The conveyor assembly of claim 1, wherein each partition includes a partition wall extending between the retainers, the partition wall having a bottom edge that is elevated and thereby spaced above the conveyor transport surface.

8. The conveyor assembly of claim 1, wherein the folded construction creates the smooth radiused tip along the top edge thereof with a hem portion along one side.

9. The conveyor assembly of claim 1, wherein the at least one partition comprises at least one corrugation formed therein and extending longitudinally to enhance rigidity.

10. The conveyor assembly of claim 1, wherein the at least one partition comprises at least two partitions creating at least one lane of adjustable size.

11. The conveyor assembly of claim 1, wherein the at least one partition comprises outer partitions and at least one intermediate partition creating at least two lanes of adjustable size.

12. The conveyor assembly of claim 1, wherein the conveyor comprises: (a) a pair of rails extending parallel to the longitudinal span in spaced relation; (b) plurality of rods extending transversely between the rails; and (c) a plurality of wheels supported by the rods for rotation relative to the rails, the conveyor transport surface provided collectively by the wheels.

13. The conveyor assembly of claim 12, wherein the retainers include an inlet retainer in a region of the inlet and an outlet retainer in a region of the outlet.

14. The conveyor assembly of claim 1, further comprising a snap fit between the retainers and the at least one partition.

15. The conveyor assembly of claim 12, wherein the conveyor is a gravitational feed conveyor with the inlet elevated vertically relative to the outlet to facilitate gravitational transfer between the inlet toward the outlet, and further comprising an end stop positioned at the outlet.

16. The conveyor assembly of claim 15, wherein an outlet retainer of the retainers is positioned at an end of the outlet between the end stop and the wheels.

17. The conveyor assembly of claim 16, wherein an inlet retainer of the retainers is positioned at an end of the inlet upstream from all of the wheels.

18. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers;
wherein the mounting interfaces comprise mounting slots and mounting tabs, with the mounting slots configured to removably receive the mounting tabs;
wherein the mounting slots are provided by the retainers and the mounting tabs are provided by the at least one partition;
wherein each retainer comprises a row of the mounting slots that extends transversely relative to a longitudinal span of the conveyor between the inlet and the outlet, wherein the at least one partition can be moved laterally between different positions to segment, divide or segment and divide the conveyor transport surface into one or more lanes of select width;
wherein the conveyor comprises: (a) a pair of rails extending parallel to the longitudinal span in spaced relation; (b) a plurality of rods extending transversely between the rails; and (c) a plurality of wheels supported by the rods for rotation relative to the rails, the conveyor transport surface provided collectively by the wheels,
wherein the wheels are arranged in spaced relationship laterally into a plurality of wheel rows with the wheel rows extending longitudinally between the inlet and the outlet in parallel relationship with the rails creating rows of gaps that are free of the wheels, the rows of gaps extending longitudinally between the inlet and the outlet in parallel relationship with the rails;
wherein the mounting slots are aligned with the rows of gaps to prevent a wheel from acting on both sides of the at least one partition, and
wherein the mounting slots are arranged in a series of sets spanning between the rails, with each set comprising at least two of the mounting slots, each set being respectively aligned with one of the rows of gaps, and each retainer defining a series of solid non-slotted segments defined between adjacent members of the sets.

19. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers;
wherein each partition comprises a partition wall extending between the inlet and the outlet, each partition furthering including abutments, the abutments engaging the retainers, respectively in order to space the partition wall vertically above the conveyor transport surface without contact therebetween; and
wherein the partition defines mounting tabs, each mounting tab depending from the partition wall and including a step to provide for the abutments.

20. The conveyor assembly of claim 19, wherein the partition wall and the mounting tabs are provided by a unitary sheet metal panel.

21. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers;
wherein the mounting interfaces comprise mounting slots and mounting tabs, with the mounting slots configured to removably receive the mounting tabs;
wherein the mounting slots are provided by the retainers and the mounting tabs are provided by the at least one partition; and
wherein each retainer comprises an upper panel and a lower panel arranged in spaced relationship, the upper and lower panels respectively defining upper and lower slots that are in alignment to provide the mounting slots, wherein the mounting tabs pass through both of the upper panel and the lower panel.

22. The conveyor of claim 21, wherein each retainer includes a U-shaped channel further comprising a connecting panel, the connecting panel spacing apart and joining between the upper panel and the lower panel.

23. The conveyor of claim 22, wherein the U-shaped channel further comprises: (a) location tabs on opposite sides engaging with cutouts in space relation formed into the rails of the conveyor; and (b) end panels joined to at least one of the panels; and further comprising fasteners securing the end panels and thereby the U-shaped channel to the rails.

24. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers; and
wherein the retainers include an inlet retainer and an outlet retainer, each of the inlet and outlet retainers comprising a plurality of reference characters corresponding mounting locations configured to facilitate alignment of partition mounting among the inlet retainer and the outlet retainer parallel to a longitudinal extent of the conveyor.

25. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers; and
wherein each retainer comprises a rod and a sleeve, the sleeve surrounding the rod, wherein the rod is mounted into holes of a pair of rails of the conveyor, and wherein the sleeve projects laterally between the rails, the sleeve further comprising locating tabs at opposite ends engaging the rails.

26. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers; and
wherein the mounting interfaces comprise mounting slots and mounting tabs, with the mounting slots configured to removably receive the mounting tabs, each mounting tab comprises a pair of prongs of the at least one partition that engage in a pair of slots on opposite sides of a central projection of the retainer, the central projection extending between prongs.

27. A conveyor assembly, comprising:
a conveyor including an inlet and an outlet, and a conveyor transport surface extending between the inlet and the outlet;
a plurality of retainers supported by the conveyor in spaced relation;
at least one partition extending between the retainers;
mounting interfaces between the retainers and the at least one partition facilitating removable support of each partition by the retainers;
wherein the conveyor comprises: (a) a pair of rails extending parallel to the longitudinal span in spaced relation; (b) a plurality of rods extending transversely between the rails; and (c) a plurality of wheels supported by the rods for rotation relative to the rails, the conveyor transport surface provided collectively by the wheels;
wherein the retainers include an inlet retainer in a region of the inlet and an outlet retainer in a region of the outlet; and
further comprising at least one intermediate retainer positioned intermediate of the inlet retainer and the outlet retainer, wherein a tab and slot mounting interface engages between each intermediate retainer and each partition.

28. A method of dividing a conveyor including an inlet and an outlet, and conveyor transport surface extending between the inlet and the outlet wherein the conveyor comprises: (a) a pair of rails extending parallel to the longitudinal span in spaced relation: (b) a plurality of rods extending transversely between the rails; and (c) a plurality of wheels supported by the rods for rotation relative to the rails, the conveyor transport surface provided collectively by the wheels, the method comprising:

arranging at least one partition at location laterally between the rails in parallel relationship with the rails; and removably retaining the at least one partition to the conveyor among different locations, wherein the at least one partition comprises outer partitions and at least one intermediate partition, further comprising creating at least two lanes of adjustable size with the outer partitions and the at least one intermediate partition.

29. The method of claim 28, further comprising adjusting the size of the at least two lanes by repositioning one or more of either or both of the outer partitions and the at least one intermediate partition on said spaced apart retainers that perform said removably retaining.

* * * * *